(12) United States Patent
Morikawa

(10) Patent No.: US 8,638,480 B2
(45) Date of Patent: Jan. 28, 2014

(54) IMAGE READING APPARATUS

(75) Inventor: Daisuke Morikawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 324 days.

(21) Appl. No.: 12/878,182

(22) Filed: Sep. 9, 2010

(65) Prior Publication Data

US 2011/0080626 A1 Apr. 7, 2011

(30) Foreign Application Priority Data

Oct. 6, 2009 (JP) ................................. 2009-232863

(51) Int. Cl.
- *H04N 1/46* (2006.01)
- *H04N 1/04* (2006.01)
- *H03F 3/08* (2006.01)

(52) U.S. Cl.
USPC ............................. 358/509; 358/518; 358/475

(58) Field of Classification Search
USPC .......................................... 358/509, 515, 521
See application file for complete search history.

(56) References Cited

U.S. PATENT DOCUMENTS

| | | | | |
|---|---|---|---|---|
| 4,318,122 A * | 3/1982 | White | ............................. | 358/515 |
| 5,187,570 A * | 2/1993 | Hibi et al. | ...................... | 358/520 |
| 5,495,361 A * | 2/1996 | Cresens | ........................ | 359/246 |
| 6,292,252 B1 * | 9/2001 | Frick et al. | ....................... | 355/39 |
| 7,715,060 B2 | 5/2010 | Suga et al. | ..................... | 358/474 |
| 7,884,978 B2 * | 2/2011 | Ikeno et al. | .................... | 358/509 |
| 7,893,394 B2 * | 2/2011 | Tokunaga | ....................... | 250/226 |
| 8,310,737 B2 * | 11/2012 | Nagao et al. | ................... | 358/475 |
| 8,355,184 B2 * | 1/2013 | Orikasa | .......................... | 358/475 |
| 2003/0202225 A1 * | 10/2003 | Fukawa et al. | ................ | 358/506 |
| 2008/0278779 A1 * | 11/2008 | Nishina et al. | ................ | 358/518 |
| 2010/0103455 A1 | 4/2010 | Morikawa | .................... | 358/1.15 |

FOREIGN PATENT DOCUMENTS

| | | |
|---|---|---|
| JP | 3-113961 A | 5/1991 |
| JP | 09-18655 A | 1/1997 |
| JP | 2003-087503 A | 3/2003 |
| JP | 2004-126448 A | 4/2004 |
| JP | 2009-117932 A | 5/2009 |

* cited by examiner

*Primary Examiner* — King Poon
*Assistant Examiner* — Ibrahim Siddo
(74) *Attorney, Agent, or Firm* — Fitzpatrick, Cella, Harper & Scinto

(57) ABSTRACT

An image reading apparatus irradiates a document with light, and reads the document image based on the reflected light and includes a light source which includes a plurality of LEDs, and irradiates the document with light. The apparatus also includes an LED current adjusting unit which sets the amount of current to be supplied to each LED by changing the current amounts from the end portion to the central portion in the main scanning direction of document reading, and a driving circuit which drives the LEDs by the current amounts set by the LED current adjusting unit in correspondence with the LEDs.

5 Claims, 25 Drawing Sheets

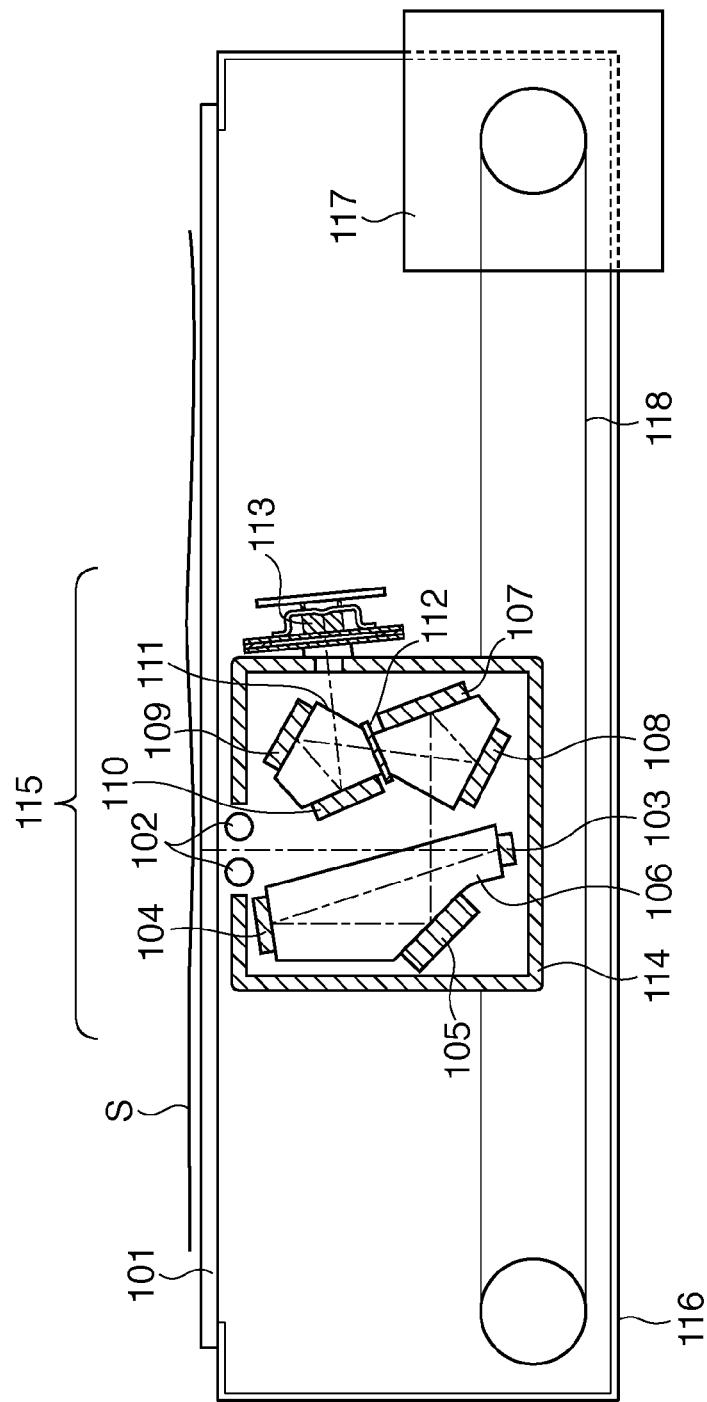

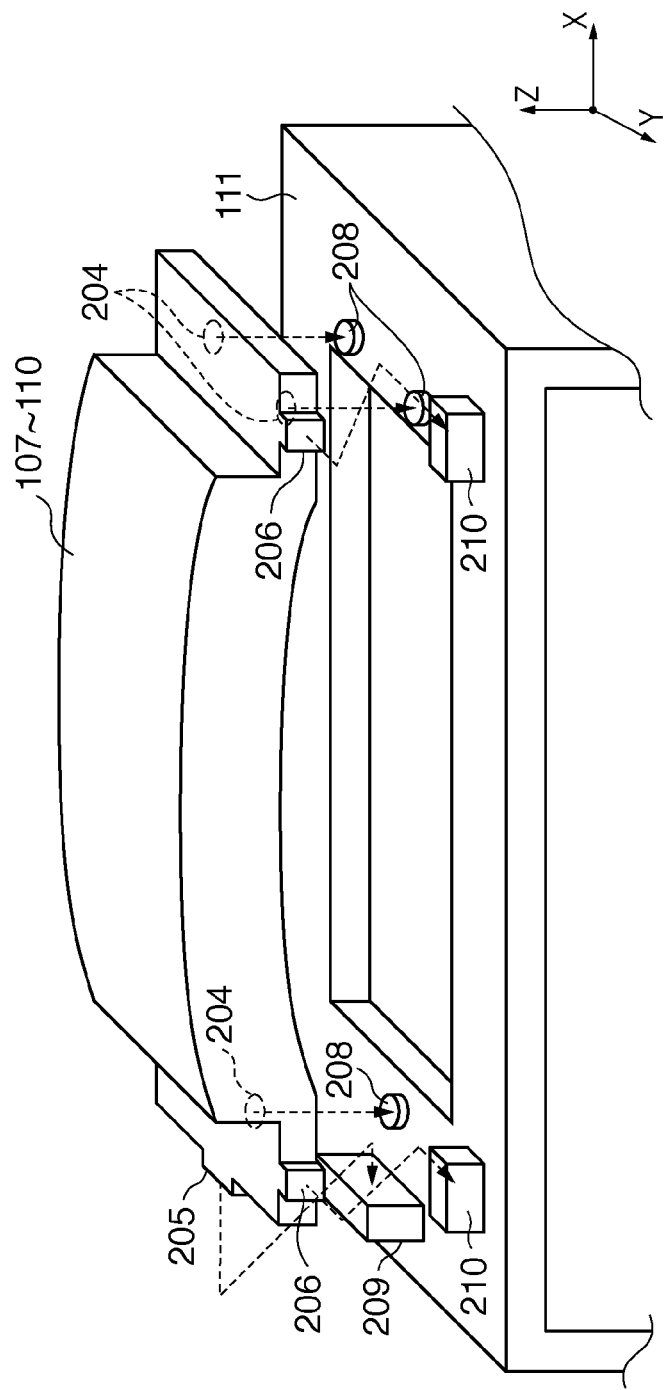

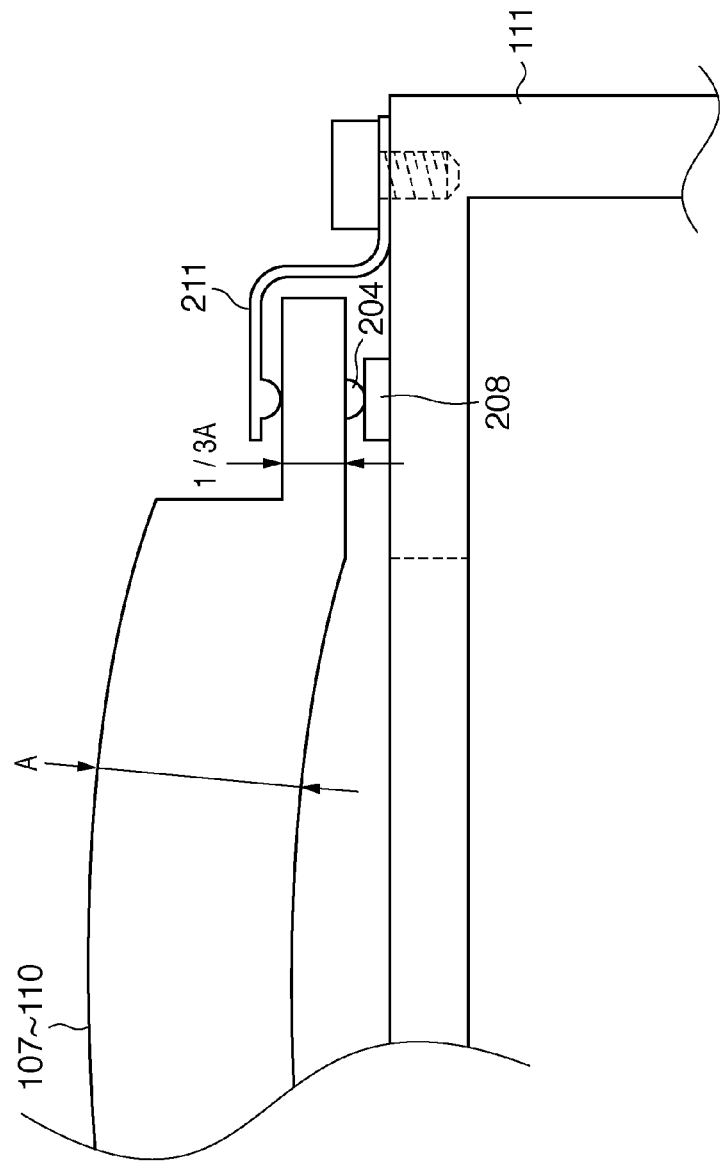

COMPARISON OF SPECTRAL CHARACTERISTIC BETWEEN WHITE REFERENCE MEMBER AND OPTICAL SYSTEM

COMPARISON OF SPECTRAL CHARACTERISTIC BETWEEN WHITE REFERENCE MEMBER AND GRAY AND BLACK PATCHES

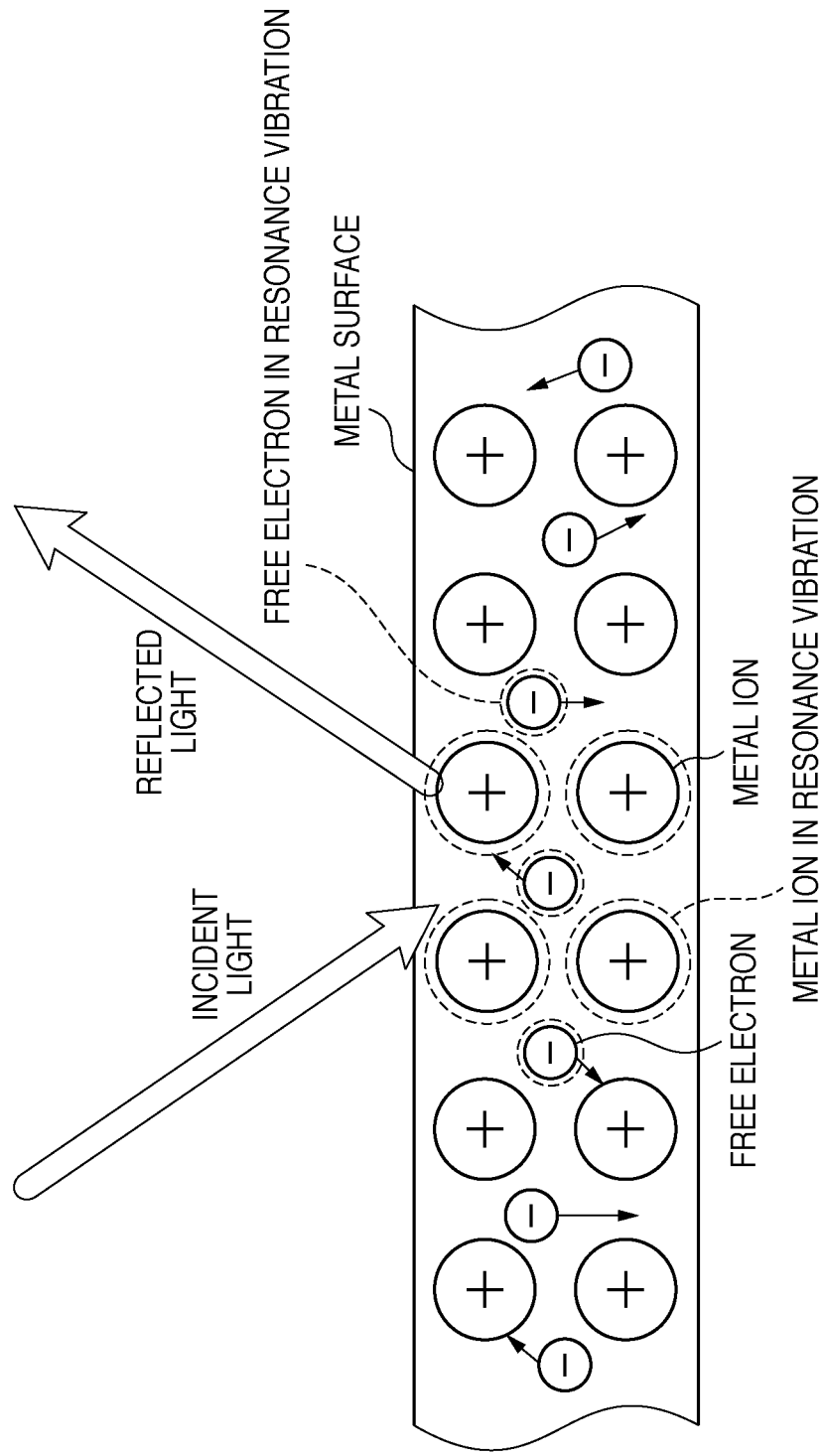

F I G. 14A
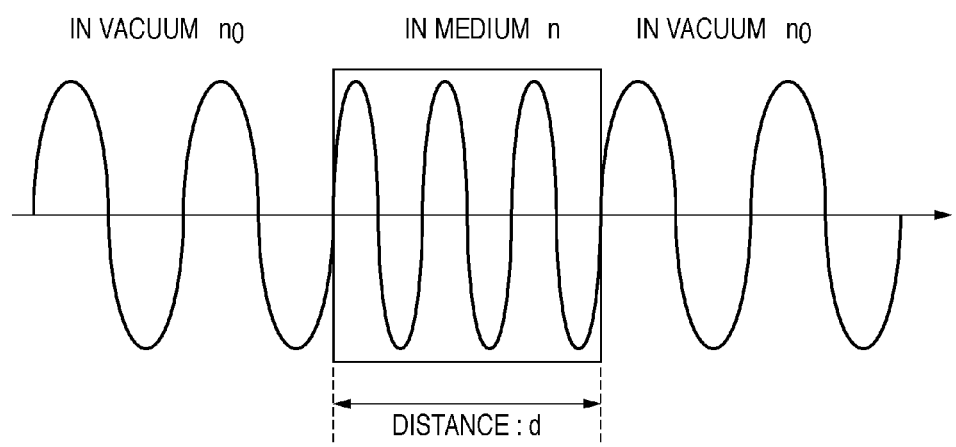

F I G. 15
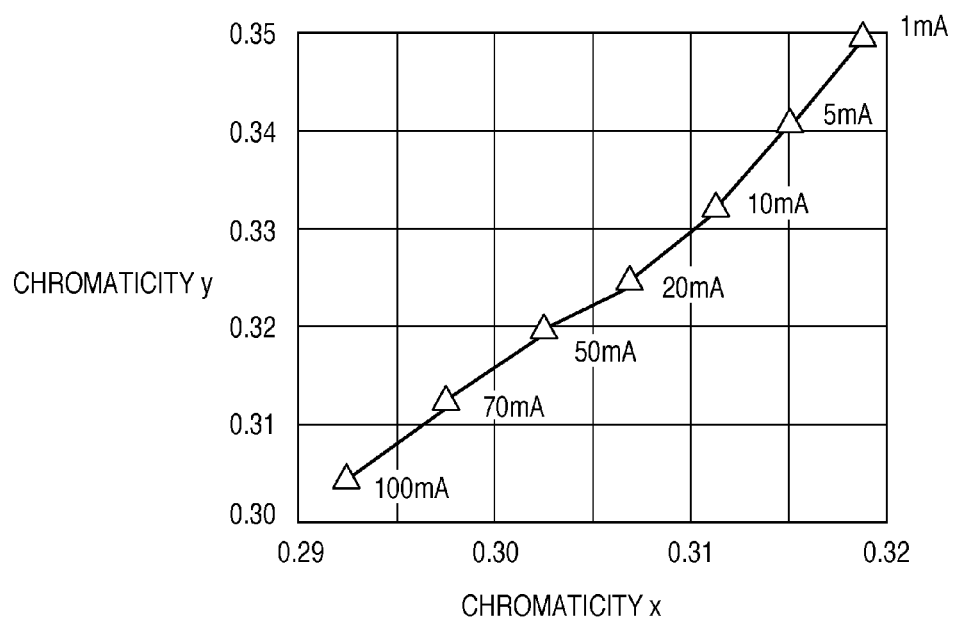

AMOUNT OF CURRENT
TO BE SUPPLIED TO CENTRAL PORTION (y = 0)

AMOUNT OF CURRENT
TO BE SUPPLIED TO END PORTION (y = 152.4)

FIG. 22A

EXAMPLE OF RELATIONSHIP BETWEEN LED DRIVING CURRENT
AND CHART (YELLOW BAND) READING LUMINANCE

| LED DRIVING CURRENT | READING LUMINANCE (CENTER) | READING LUMINANCE (END PORTION) |
|---|---|---|
| 20mA | 168.4 | 151.8 |
| 40mA | 173.3 | 156.3 |
| 60mA | 178.2 | 160.9 |
| 80mA | 183.1 | 165.4 |
| 100mA | 188.0 | 169.9 |

FIG. 22B

EXAMPLE OF RELATIONSHIP BETWEEN
LED DRIVING CURRENT AND DUTY RATIO

| LED DRIVING CURRENT | LIGHT EMISSION INTENSITY | DUTY RATIO | ON PERIOD | OFF PERIOD |
|---|---|---|---|---|
| 20mA | 1 | 100% | 100 | 0 |
| 40mA | 2.2 | 45% | 45 | 55 |
| 60mA | 3.3 | 30% | 30 | 70 |
| 80mA | 4.4 | 23% | 23 | 77 |
| 100mA | 5.5 | 18% | 18 | 82 |

FIG. 22C

EXAMPLE OF READING LUMINANCE DIFFERENCE IN
MAIN SCANNING DIRECTION

| COLOR | y=0 | y=152.4 | DIFFERENCE |
|---|---|---|---|
| CYAN | 105.6 | 102.4 | 3.2 |
| BLUE | 141.9 | 138.8 | 3.1 |

READING LUMINANCE DIFFERENCES BETWEEN END PORTION AND CENTRAL PORTION IN MAIN SCANNING DIRECTION BEFORE AND AFTER LED COLOR ADJUSTMENT

▲ AFTER COLOR ADJUSTMENT
□ BEFORE COLOR ADJUSTMENT

| PATCH NO. | PATCH COLOR | BEFORE COLOR ADJUSTMENT | | | AFTER COLOR ADJUSTMENT | | |
|---|---|---|---|---|---|---|---|
| | | y=0 | y=152.4 | DIFFERENCE | y=0 | y=152.4 | DIFFERENCE |
| 87 | YELLOW | 182.0 | 165.5 | 16.5 | 168.4 | 169.9 | 1.5 |
| 58 | GOLDEN YELLOW | 167.7 | 151.2 | 16.5 | 154.4 | 156.0 | 1.6 |
| 53 | OCHER YELLOW | 132.0 | 118.4 | 13.6 | 122.2 | 122.4 | 0.2 |

IMAGE READING APPARATUS

BACKGROUND OF THE INVENTION

1. Field of the Invention

The present invention relates to an image reading apparatus for photoelectrically reading a document image.

2. Description of the Related Art

In general, an image reading apparatus mounted on a digital copying machine or the like includes an imaging lens, a line sensor, and a reflecting mirror. The imaging lens and the line sensor are fixed in a body (Japanese Patent Laid-Open No. 3-113961). On the other hand, the reflecting mirror is mounted on a movable scanning unit to move in the sub-scanning direction with respect to a document. In the image reading apparatus described in Japanese Patent Laid-Open No. 3-113961, the maximum viewing angle is generally designed to be almost 20°.

FIG. 25 depicts a plan view for explaining the viewing angle in an image reading apparatus. The vertical direction of FIG. 25 corresponds to the main scanning direction of the image reading apparatus. The horizontal direction of FIG. 25 corresponds to the sub-scanning direction. The reflection angle at which a reflecting mirror 522 reflects a document image changes between end portions and the central portion in the main scanning direction. More specifically, at each end portion in the main scanning direction, the reflecting mirror 522 reflects light at a predetermined angle θ so that an imaging lens 525 can condense it. The angle θ is called a viewing angle. The viewing angle gradually decreases toward the center in the main scanning direction. Especially, the viewing angle θ is 0° at the center in the main scanning direction. That is, the viewing angle of the document image changes depending on the position where the reflecting mirror 522 reflects the light.

Recently, the size reduction of image reading apparatuses has received a great deal of attention. Japanese Patent Laid-Open No. 2004-126448 has proposed an image reading apparatus which reduces the size thereof by employing, as an imaging element, an offaxial imaging unit which forms an image via a plurality of mirrors each having an offaxial reflecting surface. An offaxial reflecting surface is a reflecting surface having a curvature and a reflecting direction different from the reference-optical-axis, ray-incident direction. Not only such a compact image reading apparatus but also a large image reading apparatus needs shading correction to correct the light amount unevenness. In general, a color image reading apparatus has, on the photoelectric conversion elements of a line sensor, three color filters to pass red (R), green (G), and blue (B) light components, respectively. An RGB line sensor receives the light components that have passed through the three color filters and photoelectrically converts them, thereby obtaining RGB luminance signals. The illuminance of a light source generally varies. In addition, the light amount around the imaging lens or the imaging mirror decreases. For these reasons, unevenness (shading) occurs in the illuminance on the imaging plane, and shading correction is necessary. In shading correction, generally, the sensor reads a white reference member immediately before reading a document. Based on the reading result, the gain and offset are adjusted for each pixel.

However, shading correction using the white reference member is effective only for light amount variations which are not related to the spectral characteristic (spectral optical characteristic) of the reading optical system, such as the illuminance unevenness of the light source or the decrease in the light amount around the imaging lens. That is, it is impossible to correct the influence of a change in the spectral characteristic caused by the difference in the viewing angle between the reflecting mirror, the imaging mirror, and the imaging lens.

FIG. 26 depicts a view illustrating a graph showing the spectral characteristics of the reflecting mirror corresponding to different viewing angles (15°, 30° and 45°). The abscissa represents the wavelength, and the ordinate represents the reflectance. As is apparent from FIG. 26, when the viewing angle becomes larger, the spectral characteristic shifts toward shorter wavelengths as a whole (the principle of wavelength shift will be described later).

The change in the spectral characteristic depends on the viewing angle when a document image becomes incident on the reflecting mirror, the imaging mirror, and the imaging lens. For this reason, the larger the viewing angle, the larger the change in the spectral characteristic. Note that the spectral characteristic of the entire reading optical system is given as the product of the spectral characteristics of all devices such as the light source, mirrors, and the image sensor included in the reading optical system. At the time of shading correction, therefore, the change in the spectral characteristic of the whole optical system depending on the viewing angle affects the spectral characteristic of the white reference member.

Especially when the light reflected by the document is light of a color (achromatic color such as white, black, or gray) having a spectral characteristic similar to that of white of the white reference member, the effect of shading correction is surely obtained. However, if the light reflected by the document is chromatic light, the main-scanning reading luminance becomes uneven even after shading correction. This is because the shading correction, which is performed based on light of the peak wavelength of white light, cannot completely correct shading of chromatic light that is different from the peak wavelength. This problem can arise both in reading a chromatic color using an RGB line sensor and in reading a chromatic color using a monochrome line sensor to be described later.

In general, when the difference in the viewing angle between the end portion and the central portion in the main scanning direction is small, the influence of the change in the spectral characteristic of the optical system depending on the viewing angle also becomes small. For example, as in the image reading apparatus described in Japanese Patent Laid-Open No. 3-113961, the difference in the viewing angle can be made smaller by prolonging the optical path from the reflecting mirror to the CCD sensor. However, since a longer optical path leads to an increase in the size of the image reading apparatus, the object to form a compact apparatus, and thus reduce the cost, cannot be achieved.

In addition to the white reference member, reference boards of red, green, and blue, or cyan, magenta, and yellow having managed densities may be provided, and a shading correction coefficient may be determined for each color. This method also enables a reduction of the unevenness in the main-scanning reading luminance of a chromatic color. In this method, however, the cost inevitably increases since the number of reference boards that need density management increases. It is also necessary to hold, in a memory, the same number of shading correction coefficients as the number of colors of the reference boards. Also required is a circuit for discriminating a color on a document and selecting a correction coefficient in accordance with the color. This makes the shading correction circuit larger and more complex.

Japanese Patent Laid-Open No. 2003-087503 has proposed an image sensor of 4-line sensor type including three color line sensors (RGB line sensors) and one monochrome line sensor. The four line sensors generally have a sensitivity difference between them due to the presence/absence of color filters. To prevent this, Japanese Patent Laid-Open No. 2003-087503 has proposed evaporating any one of RGB filters on the monochrome line sensor as well. In this case, however, the sensitivity of the monochrome line sensor decreases, and the SN (signal to noise) ratio therefore decreases in high-speed reading. Instead of evaporating a color filter on the monochrome line sensor, the monochrome reading speed may be made higher than the color reading speed. This is supposed to improve the SN ratio. However, if the reading speed of the color sensors is different from that of the monochrome line sensor, a spectral characteristic sensitivity difference is generated between the sensors depending on the presence/absence of a color filter, and the degree of occurrence of unevenness in the main-scanning reading luminance changes between them.

SUMMARY OF THE INVENTION

An aspect of the present invention is to eliminate the above-mentioned problems with the conventional technology.

A feature of the present invention is to reduce unevenness in main-scanning reading luminance and degradation in image quality.

According to an aspect of the present invention, there is provided an image reading apparatus comprising:

a light source unit having a plurality of light sources, that irradiates a document with light;

an imaging unit that condenses the light reflected by the document and forms an image;

a plurality of color separation units that separate colors of the reflected light whose image is formed by the imaging unit, each of the plurality of color separation units having different passing wavelength bands from each other;

a plurality of photoelectric conversion units each of which converts the reflected light color-separated by a corresponding one of the plurality of color separation units into an electrical signal;

a current amount setting unit that sets an amount of current to be supplied to each light source by changing the current amounts from an end portion to a central portion in a main scanning direction of document reading; and a driving unit that drives the light sources by the current amounts set by the current amount setting unit in correspondence with the light sources.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A depicts a sectional view illustrating an example of an image reading apparatus according to an embodiment;

FIGS. 2A and 2B depict perspective views showing an imaging mirror and part of an imaging mirror holding member;

FIG. 3 depicts an enlarged sectional view showing an imaging mirror and part of an imaging mirror holding member;

FIG. 13 depicts a view showing the relationship between incident light and reflected light on a metal surface;

FIGS. 14A to 14C depict views for explaining light that passes through a medium, an example of light that obliquely becomes incident on a thin film, and Fresnel coefficients at interfaces upon oblique incidence;

FIG. 15 depicts a view illustrating a graph of the dependence of the chromaticity of a white LED on a supplied current amount;

FIGS. 22A to 22C depict views illustrating tables showing the relationship between the LED driving current and the reading luminance, the relationship between the LED driving current and the duty ratio, and examples of reading luminance;

DESCRIPTION OF THE EMBODIMENTS

An embodiment of the present invention will now be described hereinafter in detail, with reference to the accompanying drawings. It is to be understood that the following embodiment is not intended to limit the claims of the present invention, and that not all of the combinations of the aspects that are described according to the following embodiment are necessarily required with respect to the means to solve the problems according to the present invention.

This embodiment aims at reducing the unevenness in main-scanning reading luminance, not only when a line sensor for monochrome reading reads a chromatic color, but also when an RGB 3-line sensor for color reading reads a chromatic color. In the following embodiment, an image reading apparatus will be described which employs an image sensor of 4-line sensor type including an RGB 3-line sensor for color reading and a line sensor for monochrome reading. Unevenness in the reading luminance of a chromatic color read by the line sensor for monochrome reading will be explained first. Then, the 3-line sensor for color reading will be explained.

An RGB 3-line sensor includes an R (red) line sensor, a G (green) line sensor, and a B (blue) line sensor. They have R, G, and B filters having different passing wavelength bands. These optical filters are commonly called color filters, and function as color separation units. These color filters color-separate reflected and scattered light whose image is formed by an imaging unit such as a lens. Each color-separated reflected and scattered light is converted into an electrical signal representing luminance by a corresponding line sensor (photoelectric conversion unit). Note that in general, no color filter is attached to the fourth line sensor, that is, the monochrome line sensor. In this embodiment, the image reading apparatus adopts, as a light source, a white LED (light source) formed by sealing an LED (light source) for emitting light in the blue range and a yellow phosphor in one chip.

FIG. 1A depicts a sectional view showing an example of the image reading apparatus according to the embodiment.

Figure 1B:
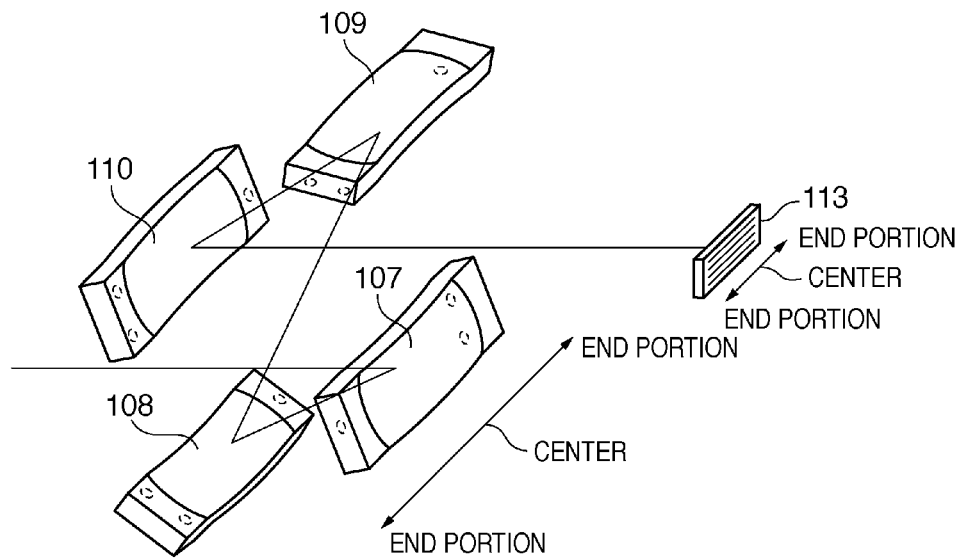
FIG. 1B depicts a perspective view showing the positional relationship between imaging mirrors and a CCD line sensor.

A document S is placed on a platen glass 101. A light source 102 is a white LED array that irradiates the document S with light. Plane mirrors 103, 104, and 105 serve as reflecting mirrors that guide the light reflected and diffused by the document S. The plane mirrors 103, 104, and 105 form a reflecting optical system. The reflecting optical system may be formed from a plurality of optical components, as described above, or a single optical component. A plane mirror holding member 106 holds the plane mirrors 103, 104, and 105. Each of imaging mirrors 107, 108, 109, and 110 has an offaxial reflecting surface. FIG. 1B depicts a perspective view showing the positional relationship between the imaging mirrors 107, 108, 109, and 110 and a CCD line sensor 113. An imaging mirror holding member 111 holds the imaging mirrors 107, 108, 109, and 110. An aperture 112 is provided in the imaging mirror holding member 111 to restrict light from the imaging mirror 108 to the CD line sensor 113. The CCD line sensor 113 is a 4-line sensor, as described above. The CCD line sensor 113 is an example of a photoelectric conversion unit which photoelectrically converts reflected and scattered light whose image is formed by an imaging unit. Note that a sensor of another scheme such as a CMOS image sensor may be adopted in place of the CCD. A scanning frame 114 holds the light source 102, plane mirrors 103, 104, and 105, the imaging mirror holding member 111, and the CCD line sensor 113. The imaging mirrors 107, 108, 109, and 110 and the imaging mirror holding member 111 form an offaxial imaging unit 115. Note that these reflecting mirrors and imaging mirrors form an example of an imaging unit which condenses the reflected and scattered light from the document S and forms an image via the plurality of plane mirrors and imaging mirrors.

A reading unit frame 116 supports the platen glass 101. The scanning frame 114 is arranged in the reading unit frame 116 and driven by a driving motor 117 and a driving belt 118 so as to reciprocally move in the sub-scanning direction in the reading unit frame 116. The scanning frame 114 is an example of a moving unit on which the light source, the imaging unit, and the photoelectric conversion unit are mounted and which moves in the sub-scanning direction (horizontal direction in FIG. 1) perpendicular to the main scanning direction.

An operation of reading the document S placed on the platen glass 101 will be described next. The light source 102 lights up so that light from it illuminates the document S. The driving motor 117 and the driving belt 118 move the scanning frame 114 in the sub-scanning direction to scan the document S. The light emitted by the light source 102 to irradiate the document S is reflected and diffused on it. The plane mirrors 103, 104, and 105 guide the diffused light to the offaxial imaging unit 115. The imaging mirrors 107 to 110 sequentially reflect the light guided to the offaxial imaging unit 115. Finally, the diffused light forms an image on the CCD line sensor 113 by the functions of offaxial reflecting surfaces formed on the imaging mirrors. The CCD line sensor 113 photoelectrically converts the received light to generate an electrical signal representing the image of the document S.

Figure 2A:
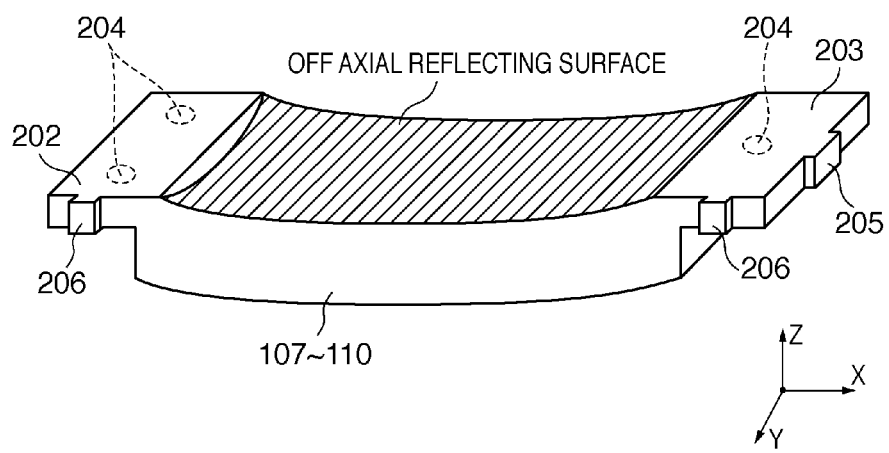

FIG. 2A depicts an enlarged view of an imaging mirror. Each of the imaging mirrors 107, 108, 109, and 110 has an offaxial reflecting surface indicated by the hatched portion in FIG. 2A. Fixing parts 202 and 203 locate and fix the imaging mirror. Hemisphere faces 204 are convex members which position the imaging mirror in the Z direction. The hemisphere faces 204 are formed at three points. A striking part 205 positions the imaging mirror in the X direction. Striking parts 206 position the imaging mirror in the Y direction. All the hemisphere faces 204 and the striking parts 205 and 206 to position the imaging mirror in the X, Y, and Z directions are provided on the fixing parts 202 and 203. The fixing parts 202 and 203 are thinner than the portion where the offaxial reflecting surface is formed, and therefore have a smaller second moment of area.

FIG. 2B depicts a perspective view showing an imaging mirror and part of the imaging mirror holding member. The imaging mirror holding member 111 has projections 208 and reception parts 209 and 210. Three projections 208 are provided to hold the three hemisphere faces 204 formed on each of the imaging mirrors 107, 108, 109, and 110. The imaging mirror is thus positioned in the Z direction. The reception part 209 holds the striking part 205. The reception parts 210 hold the striking parts 206. The imaging mirror is thus positioned in the X and Y directions.

FIG. 3 depicts an enlarged sectional view showing part of an imaging mirror and the imaging mirror holding member. Pressing members 211 are attached to the imaging mirror holding member 111 to fix the imaging mirror. The pressing members 211 are provided in correspondence with the three hemisphere faces 204, respectively. The three pressing members 211 press the imaging mirror by equal forces. Note that the forces of the pressing members 211 acting on the fixing parts 202 and 203 of the imaging mirror generate stress in it. The stress, if not removed, acts to deform the imaging mirrors 107, 108, 109, and 110. In addition, a moment is generated if the pressurization points between the hemisphere faces 204 and the pressing members 211 shift due to attachment errors of the pressing members 211 or molding errors of the imaging mirrors 107, 108, 109, and 110. The moment, if not removed, also acts to deform the imaging mirrors 107, 108, 109, and 110. However, the fixing parts 202 and 203 deform and absorb the internal stress and moment because their second moment of area is smaller than that of the portion with the offaxial reflecting surface. Hence, the deformation of the offaxial reflecting surface is very small.

When heat generated by the light source 102, the CCD line sensor 113, and the driving motor 117 is transferred to the imaging mirror via air in the image reading apparatus, the imaging mirror thermally expands. Since the imaging mirror and the imaging mirror holding member 111 have different linear expansion coefficients, stress, which acts to deform the imaging mirror, is generated. However, the fixing parts 202 and 203 absorb such internal stresses and moments as well. Hence, the deformation of the offaxial reflecting surface can be very small. If the fixing parts 202 and 203 deform, the position of the offaxial reflecting surface changes. However, the influence of the position change of the offaxial reflecting surface on the optical performance is only about 1/10 that of deformation of the offaxial reflecting surface itself. Additionally, the position change caused by the deformation of the fixing parts 202 and 203 is very small. Hence, the degradation of optical performance caused by the fixing method of this embodiment is very small and negligible for practical use.

Figure 4:
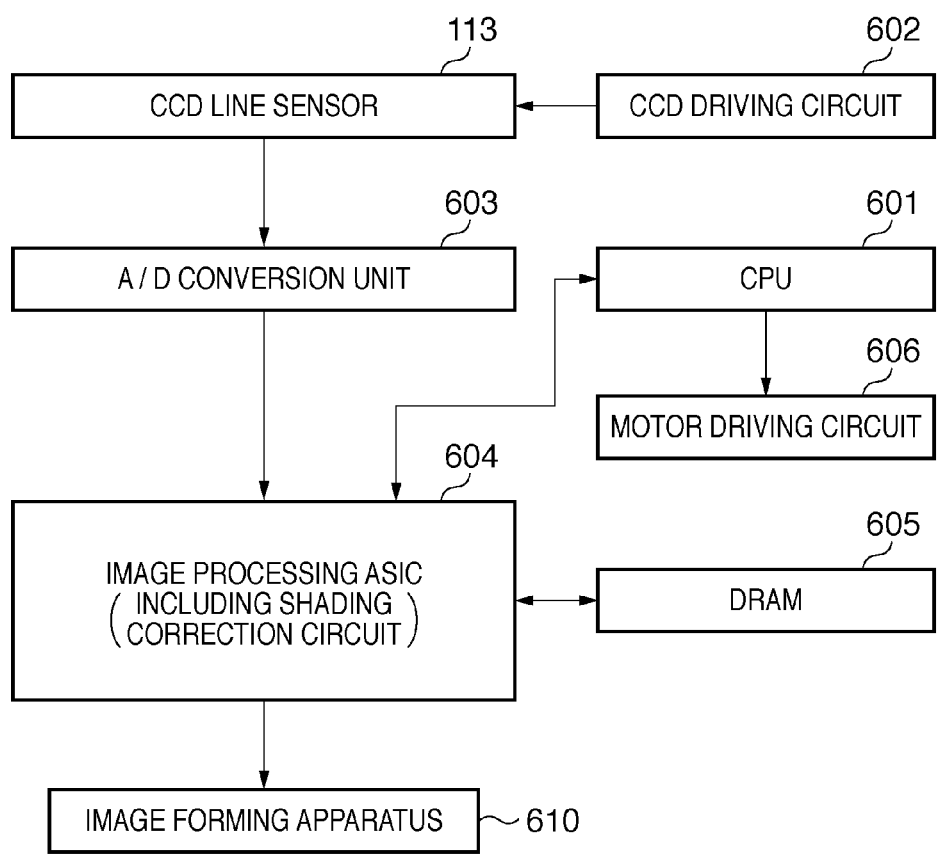
FIG. 4 is a block diagram describing the functional arrangement of the control unit of the image reading apparatus according to the embodiment.

FIG. 4 is a block diagram for describing the functions of the control unit of the image reading apparatus according to the embodiment of the present invention.

A CPU 601 is a unit that controls the units of the overall image reading apparatus. A CCD driving circuit 602 drives and controls the CCD line sensor 113. An A/D converter 603 converts an analog signal output from the CCD line sensor 113 into digital data. An image processing ASIC 604 performs image processing for the digital data output from the A/D converter 603. Examples of the image processing are shading correction, correction of color misregistration caused by the line sensor arrangement in the CCD line sensor 113, and correction of an MTF (Modulation Transfer Function) which expresses the fidelity of the contrast of a document as a spatial frequency characteristic. The image processing ASIC 604 is an example of a shading correction unit which executes shading correction using an electrical signal generated by causing the photoelectric conversion unit to convert light received from a white reference member via the imaging unit. A DRAM 605 is a storage device which temporarily stores image data. Image data processed by the image processing ASIC 604 is sent to an image forming apparatus 610. A motor driving circuit 606 drives and controls the driving motor 117 in accordance with an instruction from the CPU 601. The image forming apparatus 610 forms (prints) an image on a paper sheet based on the image data output from the image reading apparatus. The image forming apparatus 610 may be the image forming unit of a copying machine. The image forming apparatus 610 is an example of an image forming unit which receives an electrical signal representing a document image from the image reading apparatus and forms an image. The image forming unit can employ any method such as an electrophotographic method or inkjet method.

[Shading Correction]

Shading correction using a white reference member will be described next. The shading correction corrects reading variations between the pixels of image data output from the CCD line sensor 113.

First, light from the light source 102 irradiates the white reference member. The CCD line sensor 113 reads the diffused light from the white reference member. Note that the white reference member has a managed density. Using the white reference member reading result, the image processing ASIC 604 acquires shading data based on unevenness in the illuminance of the light source 102, the decrease in the light amount at the periphery of the imaging mirrors 107 to 110, and variations in the pixel sensitivity of the CCD line sensor 113.

The image processing ASIC 604 adjusts the gain value for each pixel such that each pixel value of the shading data equals an arbitrary target value (for example, "245" in luminance value). The image processing ASIC 604 stores the adjustment values in the DRAM 605 as gain adjustment values.

Next, the image processing ASIC 604 acquires shading data in the OFF state of the light source 102. The image processing ASIC 604 adjusts the offset for each pixel such that each pixel value (black offset value) of data output from the CCD line sensor 113 equals an arbitrary target value (for example, "5" in luminance value). The image processing ASIC 604 stores the adjustment values in the DRAM 605 as offset adjustment values. The image processing ASIC 604 executes gain adjustment and offset adjustment for each pixel of the image data output from the CCD line sensor 113 based on the gain adjustment values and the offset adjustment values. With the above processing, the shading correction using the white reference member is completed. The shading correction using the white reference member reduces the unevenness in the illuminance of the light source 102, the decrease in the light amount at the periphery of the imaging mirrors 107 to 110, and variations in the pixel sensitivity of the CCD line sensor 113. That is, reading in a uniform state is supposed to be possible in the main scanning direction.

[Relationship between Viewing Angle and Spectral Characteristic]

Reflected and scattered light from the document S, which is irradiated with light from the light source 102, is affected by a change in the spectral characteristic according to the viewing angle while being sequentially reflected by the plane mirrors 103 to 105 and the imaging mirrors 107 to 110. However, the maximum viewing angles of the respective mirrors do not always match. The document image reflection position (i.e., maximum viewing angle) in the main scanning direction changes between the mirrors. Hence, instead of individually showing the maximum viewing angles of the respective mirrors, a spectral characteristic after the plane mirrors 103 to 105 have sequentially reflected light will be described below as the spectral characteristic of a reflecting mirror. Similarly, a spectral characteristic after the imaging mirrors 107 to 110 have sequentially reflected light will be described below as the spectral characteristic of an imaging mirror. A change in the spectral characteristic will be expressed below not as a change in the spectral characteristic depending on the viewing angle on each mirror but as a change in the spectral characteristic depending on the image reading position on the surface of the document S, that is, imaging plane height (to be referred to as an image height hereinafter).

The relationship between the image height and the viewing angle will be explained next. A large image height indicates that the position is far apart from the optical axis center, that is, the viewing angle is large. Conversely, a small image height indicates that the position is close to the optical axis center, that is, the viewing angle is small.

Examples of the characteristics of the elements of the reading optical system employed in this embodiment will be described next.

Figure 5A:
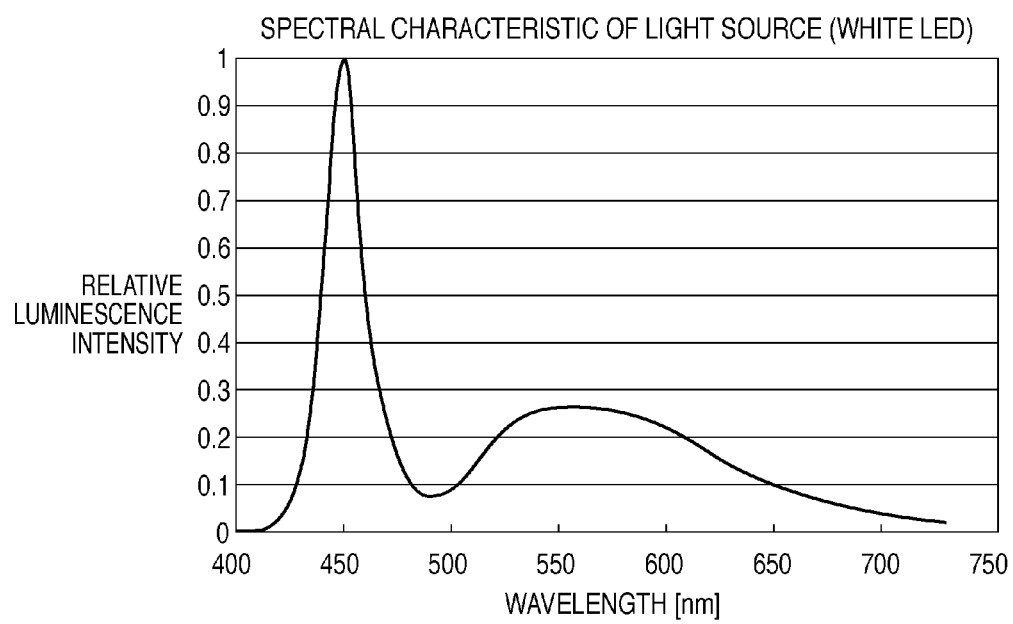
FIGS. 5A and 5B depict views illustrating graphs of examples of the spectral characteristic of a white LED and the spectral characteristic of a reflecting mirror.
Figure 5B:
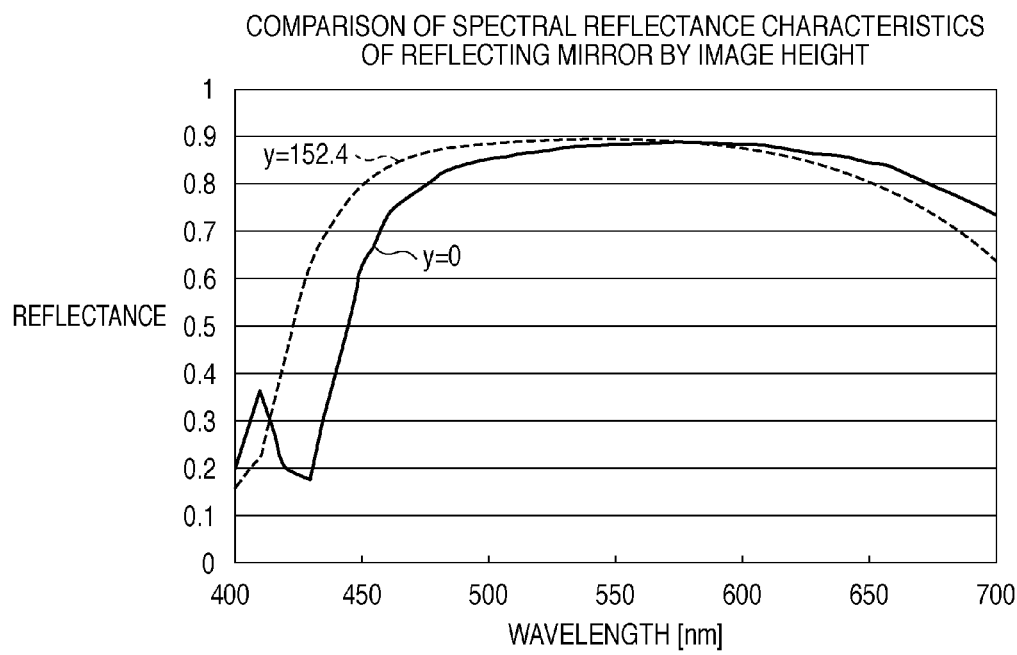
Figure 6:
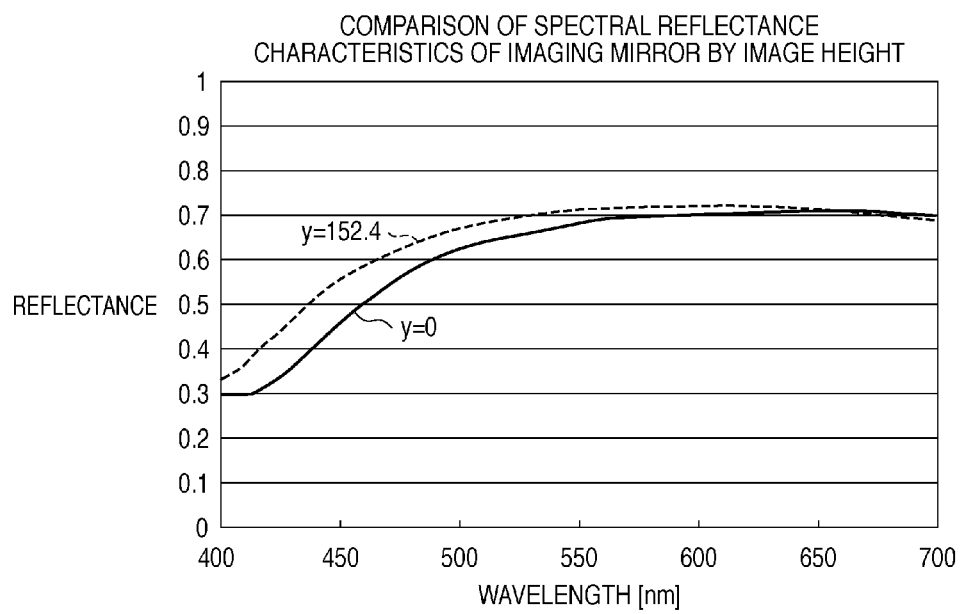
FIG. 6 depicts a view illustrating a graph of examples of the spectral characteristic of an imaging mirror.

FIG. 5A depicts a view illustrating a graph showing an example of the spectral characteristic of a white LED serving as the light source 102. The abscissa represents the wavelength, and the ordinate represents the relative-luminescence intensity. Note that the luminescence intensity of the light source corresponding to each wavelength will be referred to as a relative spectral distribution characteristic. FIG. 5B depicts a view illustrating a graph showing an example of the spectral characteristic of a reflecting mirror serving as the plane mirrors 103 to 105. FIG. 6 depicts a view illustrating an example of the spectral characteristic of the imaging mirrors 107 to 110. In FIG. 6, the abscissa represents the wavelength, and the ordinate represents the reflectance. Note that the reflectance of an optical component corresponding to each wavelength will be referred to as a spectral reflectance characteristic.

Generally, a reflecting mirror and an imaging mirror are manufactured by evaporating aluminum (Al) on glass and a resin, respectively. This aims at raising the reflectance by overcoating a dielectric substance on a metal thin film. The mirrors shown in FIGS. 5B and 6 were formed by optimization using simulations while setting the center wavelength of design at 600 nm to obtain a desired characteristic.

In this embodiment, a wide-angle imaging optical system is employed. For this reason, the change in the spectral characteristic depending on the image height (viewing angle) is larger in this embodiment than in a reduction optical system which scans a document surface using a scanning unit with a fixed light source and reflecting mirrors, as described in Japanese Patent Laid-Open No. 3-113961. "Wide-angle" indicates that the viewing angle of each mirror is large in the process of forming an image on the CCD line sensor 113. This indicates a general wide-angle lens having a focal length of 500 mm or less in a 35-mm converted value. In this embodiment, an image is formed using not lenses but mirrors. However, the definition of the focal length is the same as that for the wide-angle lens.

In FIGS. 5B and 6, the image height is represented by y. Image height y =0 corresponds to the center in the main scanning direction (the position where the viewing angle is minimized to 0°). Image height y=152.4 corresponds to an end portion in the main scanning direction (the position where the viewing angle is maximized). FIGS. 5B and 6 illustrate the difference in the spectral characteristic between the image heights. The spectral characteristic of the entire reading optical system including the sensitivities of the white LED serving as the light source 102, the plane mirrors 103 to 105, the imaging mirrors 107 to 110, and the CCD line sensor 113 before normalization based on the peak wavelength is compared with that after normalization.

Figure 7A:
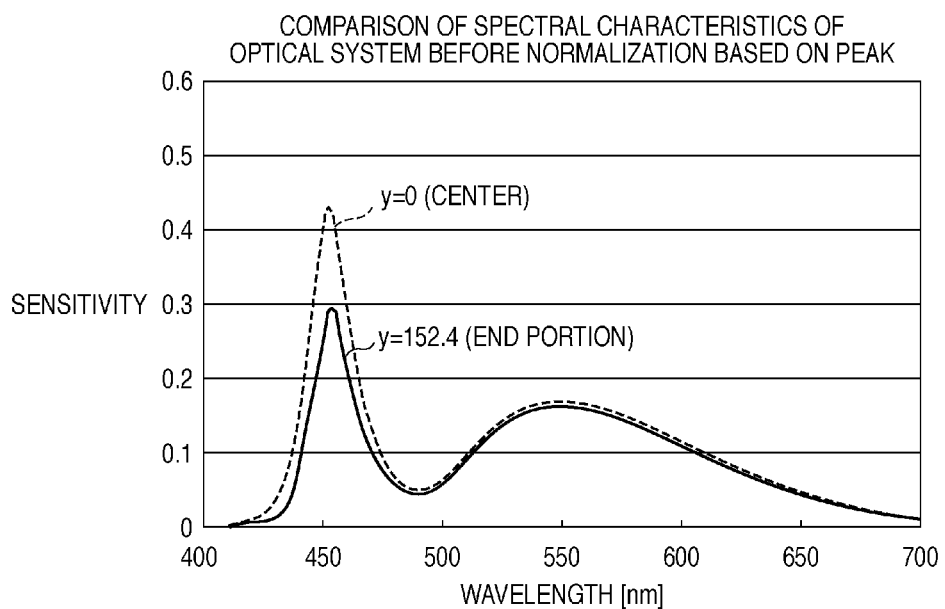
FIGS. 7A and 7B depict views illustrating graphs of the spectral characteristics of a reading optical system before and after normalization based on the peak wavelength.
Figure 7B:
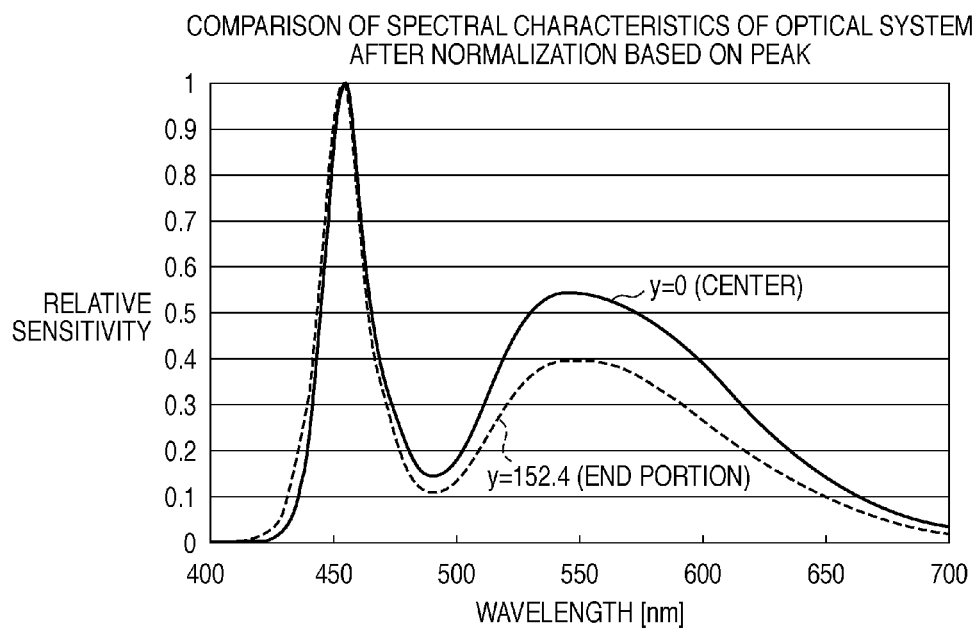

FIG. 7A depicts a view illustrating a graph showing the spectral characteristic of the entire reading optical system before normalization based on the peak wavelength. FIG. 7B depicts a view illustrating a graph showing the spectral characteristic of the entire reading optical system after normalization based on the peak wavelength. In FIGS. 7A and 7B, the abscissa represents the wavelength, and the ordinate represents the sensitivity. Note that the sensitivity of a light-receiving element or an optical component corresponding to each wavelength will be referred to as a spectral sensitivity characteristic. In FIGS. 7A and 7B, the sensitivity by which the reading optical system can read at image height y=0 is compared with that at y=152.4 at each wavelength. As is apparent from FIG. 7A, the sensitivity near the peak wavelength 450 nm largely changes in accordance with the image height. This is because the changes in the spectral characteristics of the reflecting mirror and the imaging mirror depending on the image height shown in FIGS. 5B and 6 affect the peak wavelength 450 nm of the white LED in FIG. 5A.

First, focus on the wavelength 450 nm concerning the change in the spectral reflectance of the reflecting mirror depending on the image height shown in FIG. 5B. The reflectances are about 63% at image height y=0 and 80% at image height y=152.4. Hence, the reflectance difference by the image height is 17%. Next, focus on the wavelength 450 nm concerning the change in the spectral reflectance of the imaging mirror depending on the image height shown in FIG. 6. The reflectances are about 46% at image height y=0 and 56% at image height y=152.4. Hence, the reflectance difference by the image height is 10%. As for the entire reading optical system, focus is placed on the wavelength 450 nm in FIG. 7A. The sensitivities are about 42% at image height y=0 and 29% at image height y=152.4. Hence, the sensitivity changes by 13% as the image height changes.

To check the influence of the sensitivity difference for the peak wavelength on the entire spectral characteristic, the spectral characteristic normalized based on the peak wavelength (FIG. 7B) will be examined next. Referring to FIG. 7B, the sensitivity at each wavelength is normalized based on the sensitivity near the peak wavelength 450 nm. As is apparent from FIG. 7B, the change in the sensitivity at the peak wavelength largely affects the spectral characteristic on the side of wavelengths longer than 500 nm. Especially, focus on the wavelength 550 nm where the change is large. The sensitivities are about 54% at image height y=0 and 39% at image height y=152.4. Hence, the sensitivity difference by the image height is 15%.

In the examples of the spectral characteristics of the reflecting mirror and the imaging mirror adopted in this embodiment, the changes in the spectral characteristics of the reflecting mirror and the imaging mirror depending on the image height largely affect reading of colors on the side of wavelengths longer than 500 nm.

[Unevenness in Main-Scanning Reading Luminance]

Figure 8:
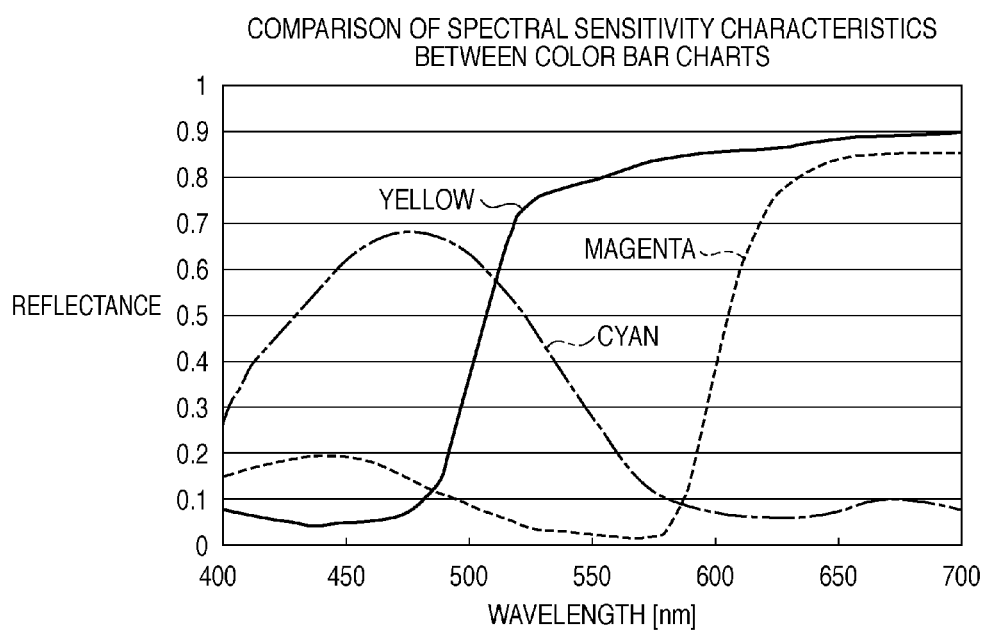
FIG. 8 depicts a view illustrating a graph showing the spectral sensitivity characteristics of yellow, cyan, and magenta.

FIG. 8 depicts a view illustrating a graph showing the spectral sensitivity characteristics of yellow, magenta, and cyan that are primary colors. Especially, yellow is a color having a prominent spectral sensitivity characteristic on the side of wavelengths longer than 500 nm.

Figure 9:
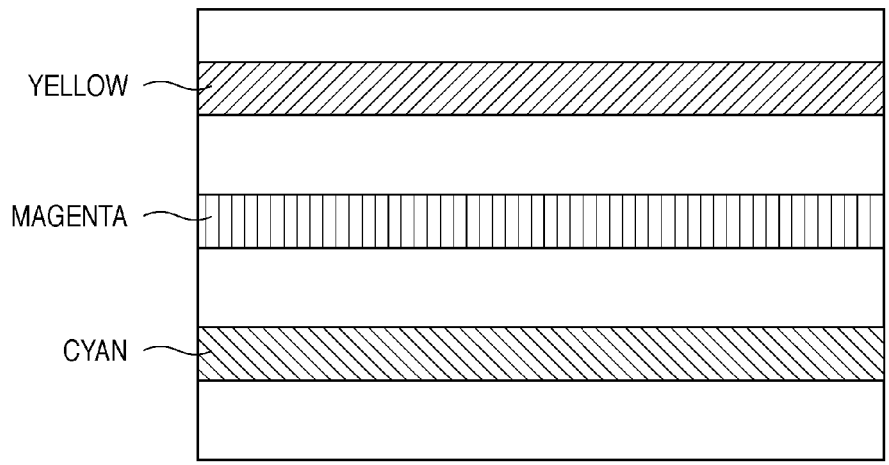
FIG. 9 depicts a view showing an example of a yellow patch chart.

FIG. 9 depicts a view illustrating an example of a chart in which yellow, magenta and cyan patches are distributed at a uniform density in the main scanning direction. This chart is used to compare the degree of influence of the change in the spectral characteristic of the reading optical system on the difference in the spectral characteristic between colors.

Figure 10:
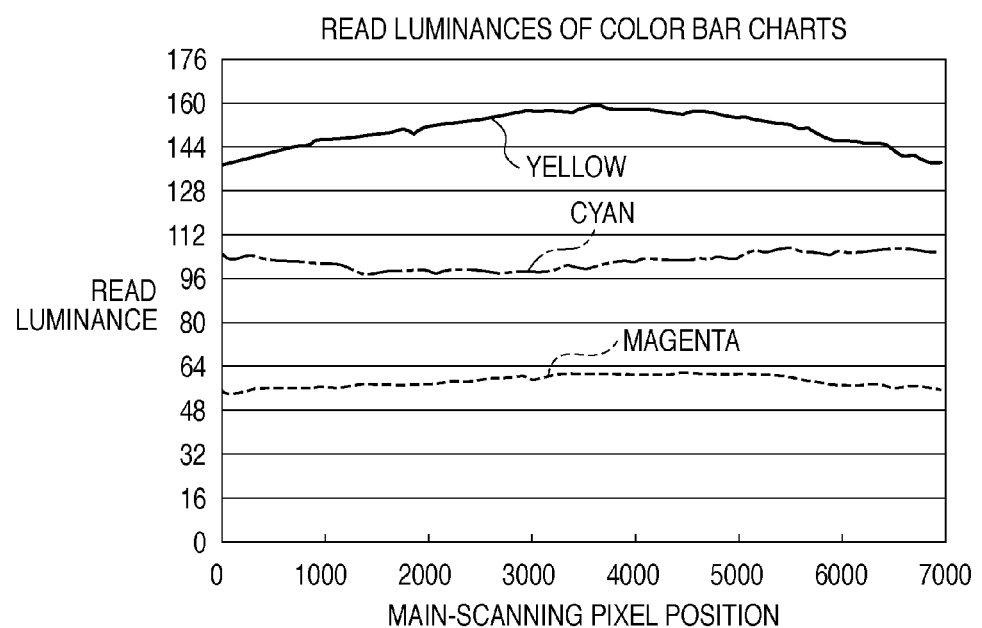
FIG. 10 depicts a view illustrating a graph of the reading luminances of the respective colors obtained by causing the reading optical system having the spectral characteristic shown in FIGS. 7A and 7B to read the chart shown in FIG. 9.

FIG. 10 depicts a view illustrating a graph showing the reading luminances of the respective colors obtained by causing the reading optical system having the spectral characteristic shown in FIGS. 7A and 7B to read the chart shown in FIG. 9. In FIG. 10, the abscissa represents the pixel position in the main scanning direction, and the ordinate represents the reading luminance.

Referring to FIG. 10, pixel position "0" in the main scanning direction corresponds to the position of image height y=152.4. This position is an end portion in the main scanning direction where the viewing angle is maximized. In addition, pixel position "3500" corresponds to the position of image height y=0. This position is the central portion in the main scanning direction where the viewing angle is minimized. Furthermore, pixel position "7000" corresponds to the position of image height y=−152.4. This position is also an end portion in the main scanning direction where the viewing angle is maximized. Both the reflecting mirror and the imaging mirror have a symmetrical surface with respect to image height y=0. This means that the larger the absolute value of the image height becomes from image height y=0, the larger the viewing angle becomes.

Referring to FIG. 10, the reading luminance of yellow is "137" at the end portion (pixel position "0" or "7000" in the main scanning direction). The luminance is "159" at the central portion (pixel position "3500" in the main scanning direction). Hence, the reading luminance difference between the end portion and the central portion in the main scanning direction is 22 in level. As for cyan and magenta, the reading luminance differences between the end portion and the central portion in the main scanning direction are 16 and 11 in level, respectively. The reading luminance is expressed here as a relative value with respect to a value normalized by setting the reading luminance of the white reference member at "255". As described above, in the reading optical system having an imaging optical system with a large viewing angle, the main-scanning reading luminance changes even after shading correction using the white reference member. This phenomenon will be called "unevenness in the main-scanning reading luminance".

[Shading Correction for Chromatic Color]

Shading correction using a white reference member is correction processing generally performed in the image reading apparatus to correct unevenness in the illuminance of the light source, variations in the line sensor output, and the decrease in the light amount at the periphery of the imaging mirrors. However, the shading correction using the white reference member cannot completely correct unevenness in the main-scanning reading luminance of a chromatic color. The reason for this will be described below.

Figure 11:
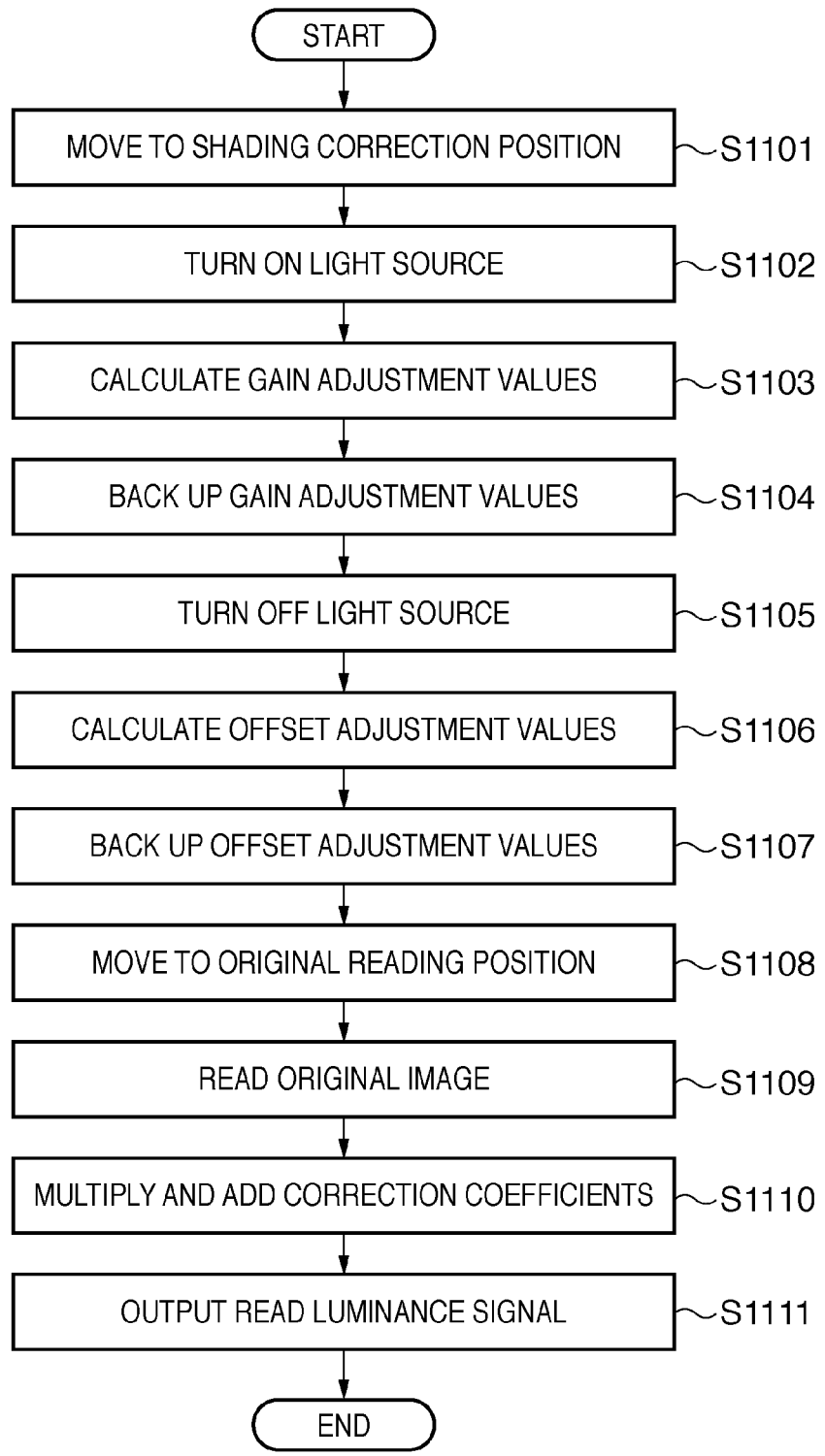
FIG. 11 is a flowchart describing an example of shading correction in the image reading apparatus.

FIG. 11 is a flowchart describing an example of shading correction in the image reading apparatus according to the embodiment. This processing is achieved by causing the CPU 601 to execute programs stored in a memory (not shown).

First, in step S1101, the CPU 601 instructs the motor driving circuit 606 to move the scanning frame 114 to a position immediately under the white reference member bonded onto the platen glass 101. The motor driving circuit 606 rotatably drives the driving motor 117 in accordance with the instruction. The process advances to step S1102, and the CPU 601 turns on the light source 102 and controls the CCD driving circuit 602 to cause the CCD line sensor 113 to acquire shading data. The process then advances to step S1103, and the CPU 601 instructs the image processing ASIC 604 to decide the gain values. The image processing ASIC 604 decides the gain adjustment value for each pixel such that each pixel value of the shading data equals a target value. The process advances to step S1104, and the CPU 601 causes the image processing ASIC 604 to store the gain adjustment values of the respective pixels in the DRAM 605. Next, in step S1105, the CPU 601 turns off the light source 102 to create a dark state. The CCD driving circuit 602 operates the CCD line sensor 113 to acquire data.

The process then advances to step S1106, and the image processing ASIC 604 calculates the reading level of the CCD line sensor 113 in the dark state as the black level offset adjustment value. In step S1107, the CPU 601 causes the image processing ASIC 604 to store the offset adjustment values of the respective pixels in the DRAM 605. In step S1108, the CPU 601 instructs the motor driving circuit 606 to move the scanning frame 114 to the position of the document S on the platen glass 101. The motor driving circuit 606 rotatably drives the driving motor 117 in accordance with the instruction.

In step S1109, the CPU 601 turns on the light source 102 in the scanning frame 114 moved to the position of the document S, and starts reading the document image. At this time, the scanning frame 114 moves in the sub-scanning direction at a predetermined speed. The CCD line sensor 113 photoelectrically generates image data in each main-scanning direction of the document formed by causing the plane mirrors 103 to 105 and the imaging mirrors 107 to 110 to sequentially reflect the light. An electrical signal representing the image of the document S is thus obtained. The A/D converter 603 converts the analog electrical signal into digital image data. The process then advances to step S1110, and the CPU 601 instructs the image processing ASIC 604 to multiply each pixel value of the image data by a corresponding gain adjustment value, and add a corresponding offset adjustment value to each obtained product. The process then advances to step S1111, and the image processing ASIC 604 outputs the image data that has undergone the shading correction to the succeeding image processing stage as a reading luminance signal.

In the series of shading correction processes, gain adjustment values corresponding to the pixels are calculated in step S1103. The gain adjustment values are calculated in consideration of the influence of the changes in the spectral characteristics of the plane mirrors 103 to 105 and the imaging mirrors 107 to 110 depending on the image height in addition to unevenness in the illuminance of the light source 102 and variations in the sensitivity of the CCD line sensor 113 between the pixels.

The changes in the spectral characteristics of the plane mirrors 103 to 105 and the imaging mirrors 107 to 110 depending on the image height affect the spectral characteristic of the entire reading optical system by the image height as well. Hence, the change in the spectral characteristic of the reading optical system depending on the image height affects the reading luminance in association with the spectral characteristic of each color on the reading target document. The reading luminance is given by the integration of the spectral characteristic of the reading optical system and that of each color on the reading target document. Even when the spectral characteristic of a color is constant in the main scanning direction, the spectral characteristic of the optical system changes with the image height, and the reading luminance also changes with the image height. Assume that the white reference member has a managed uniform density, the unevenness in the illuminance of the light source 102 and the variations in the sensitivity of the CCD line sensor 113 are negligibly small, and the spectral characteristics of the plane mirrors 103 to 105 and the imaging mirrors 107 to 110 do not change by the image height. In this case, the pixels use almost the same gain adjustment value. However, as described above, the spectral characteristics of the plane mirrors 103 to 105 and the imaging mirrors 107 to 110 change with the image height. Hence, the gain adjustment value changes between the pixels even if the influences of the unevenness in the illuminance of the light source 102 and the variations in the sensitivity of the CCD line sensor 113 are negligibly small.

Figure 12A:
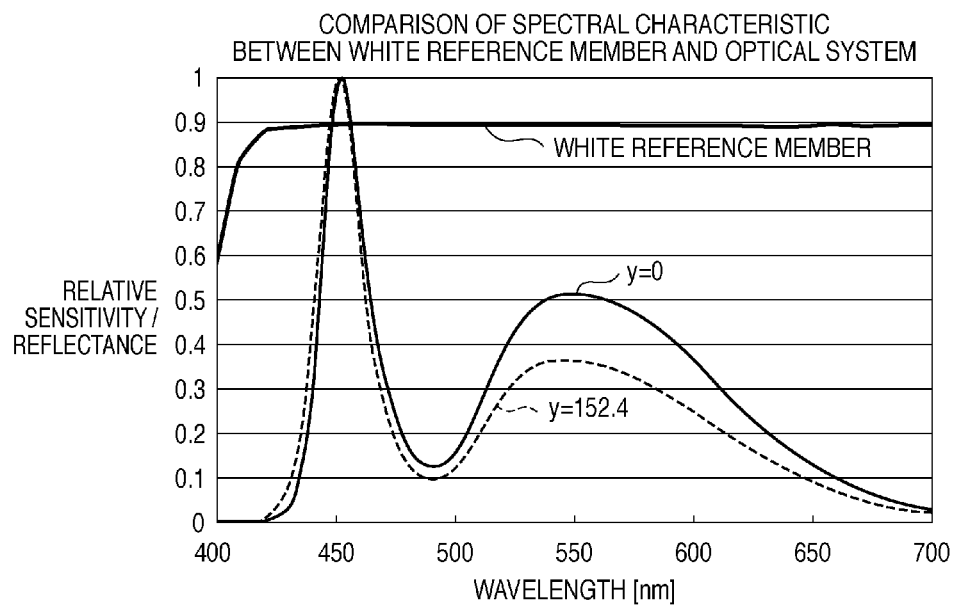
FIGS. 12A and 12B depict views illustrating graphs of comparison between the spectral characteristic of a white reference member and that of the optical system and comparison between the spectral characteristic of the white reference member and those of gray and black patches.

FIG. 12A depicts a view illustrating a graph showing the spectral characteristic of the white reference member and the spectral characteristic of the optical system normalized based on the peak wavelength. In FIG. 12A, the abscissa represents the wavelength, and the ordinate represents the relative sensitivity (reflectance). FIG. 12A shows the spectral characteristic of the optical system at image height y=0 and that at image height y=152.4. As is apparent from FIG. 12A, the spectral characteristic of the white reference member is almost constant at a reflectance of 0.9 over the wavelengths. Integrated values associated with the spectral characteristics of the white reference member and the optical system are as follows.

The integrated values are "75.7" at image height y=0 (central portion), and "59.9" at image height y=152.4 (end portion). That is, the two integrated values have a large difference. Setting the target value of shading correction to reading luminance "255", a gain adjustment value G is calculated for each of the integrated values. More specifically, $G_0$=3.38 at image height y=0, and $G_{152.4}$=4.26 at image height y=152.4, where $G_0$ and $G_{152.4}$ are gain adjustment values at image height y=0 and image height y=152.4. The image processing ASIC 604 uses these values as the correction values at the positions of image height y=0 and image height y=152.4 in shading correction. That is, the change in the spectral characteristic of the optical system depending on the image height affects the gain adjustment values in shading correction as well.

The gain adjustment values in actual shading correction are affected not only by the change in the spectral characteristic of the optical system depending on the image height, but also by the unevenness in the illuminance of the light source. However, the spectral characteristic of the light source 102 used in the image reading apparatus is managed within a predetermined specifications range. Hence, the change in the spectral characteristic caused by unevenness in the illuminance is very small. A change in the illuminance in the main scanning direction occurs as unevenness in the illuminance of the light source 102. However, if the spectral characteristic of the light source 102 does not change in the main scanning direction, unevenness in the main-scanning reading luminance by unevenness in the illuminance of the light source 102 appears in every color. More specifically, unevenness in the luminance appears not only in white of the white reference member but also in other general achromatic and chromatic colors. That is, unevenness in the main-scanning reading luminance appears not only in chromatic colors. As for unevenness in the illuminance of the light source 102, shading correction using the white reference member enables uniform reading in the main scanning direction. In this respect, unevenness in the illuminance is substantially different from unevenness in the main-scanning reading luminance caused by the change in the spectral characteristic of the reading optical system depending on the image height. Note that the change in the spectral characteristic of the reading optical system depending on the image height does not reduce the effect of shading correction using the white reference member for all colors. More specifically, the shading correction effect can be obtained for achromatic colors such as white, black, and gray. The reason will be explained below.

Figure 12B:
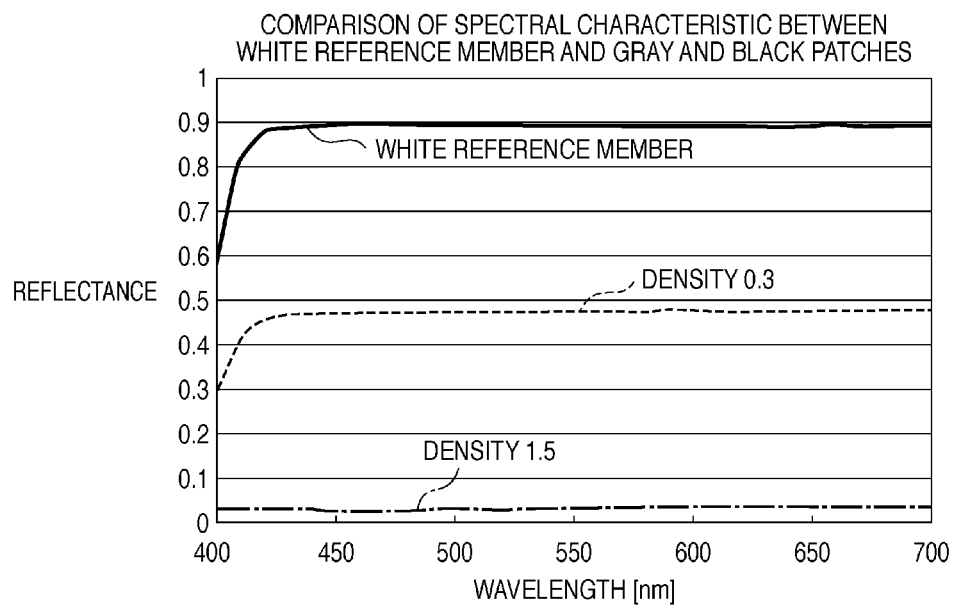

FIG. 12B depicts a view illustrating a graph showing comparison between the spectral characteristic of the white reference member shown in FIG. 12A and those of a gray patch having a density of 0.3 and a black patch having a density of 1.5. In FIG. 12B as well, the abscissa represents the wavelength, and the ordinate represents the reflectance.

Referring to FIG. 12B, like the spectral characteristic of the white reference member, the reflectance of the gray patch having the density of 0.3 is almost constant at "0.48" over the wavelengths. The reflectance of the black patch having the density of 1.5 is almost constant at "0.03" over the wavelengths. The results of integration of the spectral characteristic at the density of 0.3 and the spectral characteristic of the optical system are as follows.

The integrated values are "40.0" at image height y=0 (center), and "31.7" at image height y=152.4 (end portion). That is, the integrated values have a difference. These values are multiplied by the gain adjustment values $G_0$ and $G_{152.4}$, respectively. The reading luminance values are calculated as "135" at image height y=0 (central portion), and "135" at image height y=152.4 (end portion).

The results of integration of the spectral characteristic at the density of 1.5 and the spectral characteristic of the optical system are as follows. The integrated values are "2.69" at image height y=0 (central portion), and "2.13" at image height y=152.4 (end portion). That is, the integrated values have a small difference. These values are multiplied by the gain adjustment values $G_0$ and $G_{152.4}$, respectively. The reading luminance values are calculated as "9" at image height y=0 (central portion), and "9" at image height y=152.4 (end portion). That is, no unevenness in the main-scanning reading luminance is generated in a color (a wavelength (color) within the range of 400 nm to 700 nm at which the reflectance is almost constant regardless of its value) very closer to the white reference member concerning the spectral characteristic. More specifically, no unevenness in the main-scanning reading luminance is generated in gray or black even when the gain adjustment values determined based on the white reference member are used.

The gain adjustment values $G_0$ and $G_{152.4}$ are determined to correct the change in the reading value of the white reference member depending on the image height. In a color having a spectral characteristic very closer to that of the white reference member, the reading luminance change ratio by the image height is almost constant regardless of the reflectance value. For this reason, a desired effect can be obtained by shading correction using the white reference member.

However, when the same calculation as described above is performed for the spectral characteristic of yellow shown in FIG. 8, the integrated values of the spectral characteristics of yellow and the optical system are as follows. The integrated values are "48.1" at image height y=0 (central portion), and "33.7" at image height y=152.4 (end portion). That is, the integrated values corresponding to the respective image heights have a difference. These integrated values are multiplied by the corresponding gain adjustment values $G_0$ and $G_{152.4}$, respectively, thereby calculating reading luminance values. The reading luminance values are "162" at image height y=0 (central portion), and "144" at image height y=152.4 (end portion). That is, the reading luminance values corresponding to the image heights have a difference of 18 in level.

The above examination has placed focus on only the gain adjustment values, but has not taken the offset correction values into consideration. This is because offset correction is done in the OFF state of the light source and not affected by the spectral characteristic of the optical system.

As described above, shading correction using the white reference member can reduce unevenness in the main-scanning reading luminance of an achromatic color having a spectral characteristic almost similar to that of the white reference member. As for a chromatic color, however, the shading correction using the white reference member cannot completely correct unevenness in the main-scanning reading luminance. That is, in the image reading apparatus having a wide-angle imaging optical system, unevenness in the main-scanning reading luminance remains in a chromatic color even after shading correction using the white reference member.

A method of reducing unevenness in main-scanning reading luminance generated in a chromatic color according to the embodiment will be described next. To reduce unevenness in main-scanning reading luminance generated in a chromatic color, methods of reducing a change in the spectral characteristic of the reading optical system depending on the image height are usable.

For example, one of the methods decreases the viewing angle of a read image incident on the reflecting mirror or the imaging mirror. To make the viewing angle smaller at the end portion in the main scanning direction, it is necessary to increase the distance between the mirrors, that is, prolong the optical path. However, to increase the distance between the mirrors, the image reading apparatus needs to be large. Additionally, the members are also expected to be more expensive as the apparatus becomes large. For these reasons, the method cannot meet the requirements of a size and a cost reduction of the apparatus.

As another method, reference boards of red, green, and blue, or cyan, magenta, and yellow having managed densities are provided in addition to the white reference member, and the shading correction coefficient is changed depending on the color of the document. However, when this method is employed, the number of reference boards that require density management increases. A memory for storing shading correction coefficients for the respective colors is also necessary. Also required is a circuit for discriminating a color on the document. This inevitably increases the cost and size of the apparatus.

This embodiment proposes a method of making changes in the spectral characteristics of the reflecting mirror and the imaging mirror depending on the image height smaller in the wavelength band near the peak wavelength of the light source. More specifically, a plurality of white LEDs each formed by sealing a blue LED and a yellow phosphor in one chip are arranged in the main scanning direction. The amount of current to be supplied to each LED is adjusted, thereby adjusting the chromaticity of light emitted by each LED. The supplied current amount is controlled by PWM. The amount of light to be emitted by each LED is thus adjusted. This method was devised based on the finding that the change in the spectral characteristic of the optical system depending on the image height mostly results from a portion where the peak wavelength of the light source overlaps the changes in the spectral characteristics of the reflecting mirror and the imaging mirror depending on the image height. This reduces unevenness in the main-scanning reading luminance of a chromatic color. This method is more advantageous than the above-described methods regarding the cost and size of the apparatus as well.

In this embodiment, a white LED having the spectral characteristic shown in FIG. 5A is used as the light source. The peak wavelength is about 450 nm. As described above, since the spectral characteristics of the reflecting mirror and the imaging mirror change depending on the image height with respect to the peak wavelength of the light source, unevenness in the main-scanning reading luminance still occurs in a chromatic color even after shading correction using the white reference member. To cope with this, the changes in the spectral characteristics of the reflecting mirror and the imaging mirror, depending on the image height, are made smaller at 450 nm, that is, the peak wavelength of the white LED.

[Spectral Characteristic of Mirror]

The spectral characteristics of the reflecting mirror and the imaging mirror will be described. In general, a mirror is formed by evaporating a thin film of a metal such as aluminum, silver, chromium, or copper on a surface of glass, plastic, or resin. Hence, the spectral characteristic of a mirror changes depending on the type of evaporated metal.

FIG. 13 depicts a view showing the relationship between incident light and reflected light on a metal surface. When light strikes the metal surface, metal ions or free electrons in the thin film layer of the surface absorb the light energy and cause resonance oscillation. The oscillation energy is emitted from the metal surface. This is the phenomenon of light reflection from the metal.

The reflectance can be raised by overcoating on the metal film a multilayered dielectric film of, for example, magnesium fluoride ($MgF_2$) serving as the protective film of the mirror. However, the reflectance is known to depend on the wavelength or the incident angle. In addition, changing the thickness of the evaporated reflecting film enables to shift the whole spectral characteristic of the mirror toward shorter wavelengths. This will be explained below.

FIG. 14A depicts a view for describing light that passes through a medium. The phase velocity of light generally changes depending on a medium through which it passes. However, a frequency ν of light does not change. Examine a case in which light propagates through the interfaces between vacuum and a medium while becoming incident vertically and causing sine wave oscillation. Let $n_0$, $\lambda_0$, and c be the refractive index, wavelength, and velocity of light in vacuum. Let n, λ, and ν be the refractive index, wavelength, and velocity of light in the medium. Then, we have, $$n = c/v = (\lambda_0 \cdot \nu)/(\lambda \cdot \nu) = \lambda_0/\lambda \quad (1.1)$$

As shown in FIG. 14A, the wavelength λ in the medium having the refractive index n is 1/n the wavelength in vacuum. When n>1, the wavelength in the medium is shorter than that in vacuum. Letting d be the distance of the medium having the refractive index n, the number of waves included in the medium is given by $$d/\lambda = nd/\lambda_0 \quad (1.2)$$

This equals the number of waves having the wavelength $\lambda_0$ included within the distance nd. The value nd is called an optical distance or an optical thickness.

Figure 14B:
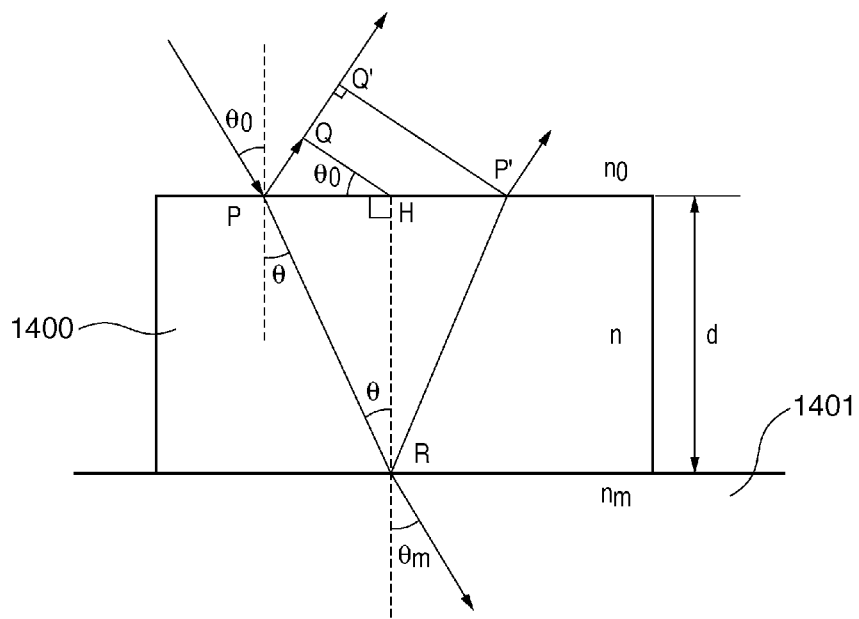

FIG. 14B depicts a view for describing an example of light that obliquely becomes incident on a thin film 1400. Let $n_0$, $\lambda_0$, and $\theta_0$ be the refractive index, wavelength, and incident angle of light in vacuum. Let n, λ, and θ be the refractive index, wavelength, and refraction angle of light in the thin film 1400. Let $n_m$, $\lambda_m$, and $\theta_m$ be the refractive index, wavelength, and incident angle of light in a substrate 1401 on which the thin film 1400 is evaporated.

When light becomes incident obliquely from vacuum onto the thin film 1400, an optical path difference is generated. More specifically, an optical path difference is generated between light reflected by the surface of the thin film 1400 (light propagating from a point P to a point Q in FIG. 14B) and light which enters and propagates through the thin film and returns into vacuum again upon being reflected by the surface of the substrate 1401 (light reflected at a point R and output to vacuum at a point P' in FIG. 14B). The optical path difference PQ' is given by $$PQ' = nPR - n_0 PQ \quad (1.3)$$
$$= n(PH/\sin\theta) - n_0 PH \sin\theta_0$$
$$= (n/\sin\theta - n_0 \sin\theta_0)PH$$
$$= (n/\sin\theta - n_0 \sin\theta_0)d\tan\theta$$
$$= (n/\sin\theta - n\sin\theta)d\tan\theta$$
$$= nd(1/\cos\theta - \sin^2\theta/\cos\theta)$$
$$= nd(1 - \sin^2\theta)/\cos\theta$$
$$= nd\cos\theta$$

where conversion is performed using the Snell's law represented by $$n_0 \sin\theta_0 = n \sin\theta \quad (1.3.1)$$

That is, the optical thickness in oblique incidence takes a value obtained by multiplying nd in vertical incidence by cos θ, that is, becomes smaller than in vertical incidence. The optical thickness is smaller in vertical incidence. Note that the spectral characteristic changes as the optical thickness becomes smaller.

Figure 14C:
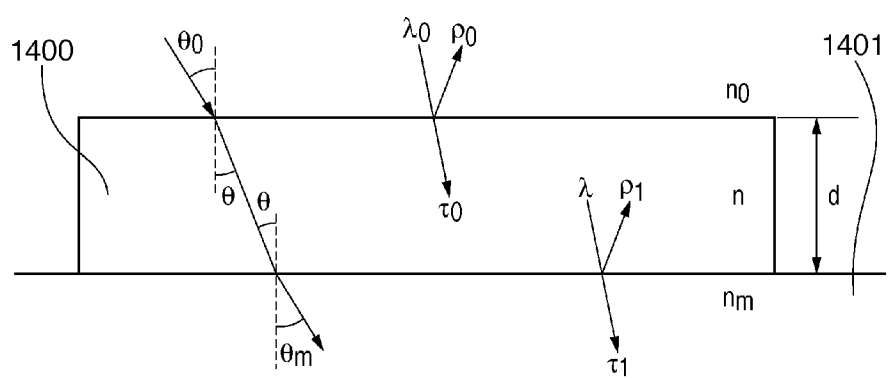

FIG. 14C depicts a view for describing Fresnel coefficients at interfaces (between vacuum and the thin film and between the thin film and the substrate) upon oblique incidence on the thin film 1400 shown in FIG. 14B. In FIG. 14C, $\rho_0$ is the Fresnel reflection coefficient upon incidence from vacuum onto the thin film 1400, $\tau_o$ is the Fresnel transmission coefficient upon incidence from vacuum onto the thin film 1400, $\rho_1$ is the Fresnel reflection coefficient upon incidence from the thin film 1400 onto the substrate 1401, and $\tau_1$ is the Fresnel transmission coefficient upon incidence from the thin film 1400 onto the substrate 1401.

A reflectance $R_f$ in such a single thin film is generally given by $$R_f = (\rho_{0f}^2 + \rho_{1f}^2 + 2\rho_{0f}\rho_{1f}\cos 2\delta)/(1 + (\rho_{0f}\rho_{1f})^2 + 2\rho_{0f}\rho_{1f}\cos 2\delta) \quad (1.4)$$

where f is a suffix representing polarization. That is, f is s or p indicating s-polarization or p-polarization. Additionally, $\rho_{0f}$ and $\rho_{1f}$ are the Fresnel reflection coefficients of s-polarization and p-polarization, respectively.

$$\rho_{0f} = (\eta_{0f} - \eta_f)/(\eta_{0f} + \eta_f)$$

$$\rho_{1f} = (\eta_f - \eta_{mf})/(\eta_f + \eta_{mf}) \quad (1.5)$$

where $\eta_{0f}$, $\eta_f$ and $\eta_{mf}$ are defined by $$\eta_{0s} = n_0 \cos\theta_0$$

$$\eta_{0p} = n_0/\cos\theta_0$$

$$\eta_s = n \cos\theta$$

$$\eta_p = n/\cos\theta$$

$$\eta_{ms} = n_m \cos\theta_m$$

$$\eta_{mp} = n_m/\cos\theta_m \quad (1.6)$$

where $n_0$, n, and $n_m$ are the refractive indices in vacuum, thin film 1400, and substrate 1401, respectively, $\theta_0$ is the incident angle from vacuum to the thin film, θ is the refraction angle from vacuum to the thin film, and $\theta_m$ is the refraction angle from the thin film to the substrate. The Snell's law holds between the refractive indices and the incident angle.

$$n_0 \sin\theta_0 = n \cos\theta = n_m \cos\theta_m \quad (1.7)$$

In addition, δ in Expression (1.4) represents a phase change in the thin film, and is obtained based on Expression (1.3) by $$\delta = (2\pi/\lambda) nd \cos\theta \quad (1.8)$$

As shown in Expression (1.8), the optical thickness changes depending on the incident angle on the thin film. Additionally, the change in the optical thickness causes a phase change in the thin film. The phase change δ in the thin film affects the reflectance $R_f$ as indicated by Expression (1.4). Based on the above-described principle, the spectral characteristics of the reflecting mirror and the imaging mirror change in accordance with the image height (incident angle).

This embodiment aims at reducing unevenness in the main-scanning read luminance of a chromatic color, which remains even after shading correction using the white reference member. For this purpose, changes in the spectral characteristics of the reflecting mirror and the imaging mirror depending on the image height are made smaller at 450 nm, that is, the peak wavelength of the white LED.

[Color Adjustment by LED and Reading Characteristic]

In this embodiment, to make changes in the spectral characteristics of the reflecting mirror and the imaging mirror depending on the image height smaller, a characteristic of light emitted by the white LED, which changes its chromaticity depending on the amount of current to be supplied to the white LED, is used. The current amount is controlled such that the amounts of current to be supplied to the LEDs continuously change from the end portion to the central portion in the main scanning direction, thereby changing the chromaticity of light emitted by each LED depending on the position in the main scanning direction. However, when the amount of current supplied to an LED changes, the amount of emitted light also changes. That is, when the amount of current supplied to the LED is changed to change the chromaticity of the LED, the light amount of the LED differs from the target light amount. To prevent this, driving of the LED is controlled by PWM, thereby controlling the light amount of the LED to the target light amount. PWM is a short for pulse width modulation, which is a kind of modulation method, and implements modulation by changing the duty ratio of a pulse wave.

How to adjust the amount of current supplied to the LED will be described. The characteristics of the white LED used in this embodiment will be explained first, and a reading characteristic required of the optical system is specified from the LED characteristics.

Examine the correlation between the peak wavelength of the white LED, that is, 450 nm and that of the green wavelength band, that is, 550 nm. In FIG. 7A, the peak sensitivity at the center (y=0) corresponding to the peak wavelength 450 nm is about 1.4 times as high as that at the end portion (y=152.4). Contrarily, the peak sensitivity corresponding to the peak wavelength 550 nm is almost the same at the end and central portions. Hence, the sensitivity difference at the peak wavelength 450 nm indicates the reading characteristic difference of the optical system. If the correlation between the peak wavelength of the white LED, that is, 450 nm and that of the green wavelength band, that is, 550 nm does not largely change between the central portion and the end portion in the main scanning direction, the optical system can also obtain approximated reading characteristics at the central portion and the end portion in the main scanning direction. That is, the amount of current to be supplied to the LED is adjusted so as not to largely change the correlation between the peak wavelength of the white LED, that is, 450 nm and that of the green wavelength band, that is, 550 nm between the central portion and the end portion in the main scanning direction.

FIG. 15 depicts a view illustrating a graph showing the dependence of the chromaticity of the white LED on the supplied current amount. The duty ratio of the current supplied to the LED is assumed to be 100%. The abscissa represents a chromaticity x, and the ordinate represents a chromaticity y. As is apparent from FIG. 15, when a current of 1 mA is supplied, the chromaticities are x=0.317 and y=0.35. As the amount of current to be supplied to the LED increases, the chromaticities shift toward x=0.29 and y=0.30. As for the chromaticity shift, the spectral sensitivity of a blue LED that emits light rises as the driving current amount increases. This is because the spectral sensitivity of yellow phosphor that generates white in cooperation with the blue LED is constant independently of the amount of current to be supplied to the blue LED. That is, the reason is that the peak sensitivity of the blue LED at the peak wavelength 450 nm is relatively higher than that of the yellow phosphor at the peak wavelength 550 nm.

Figure 16A:
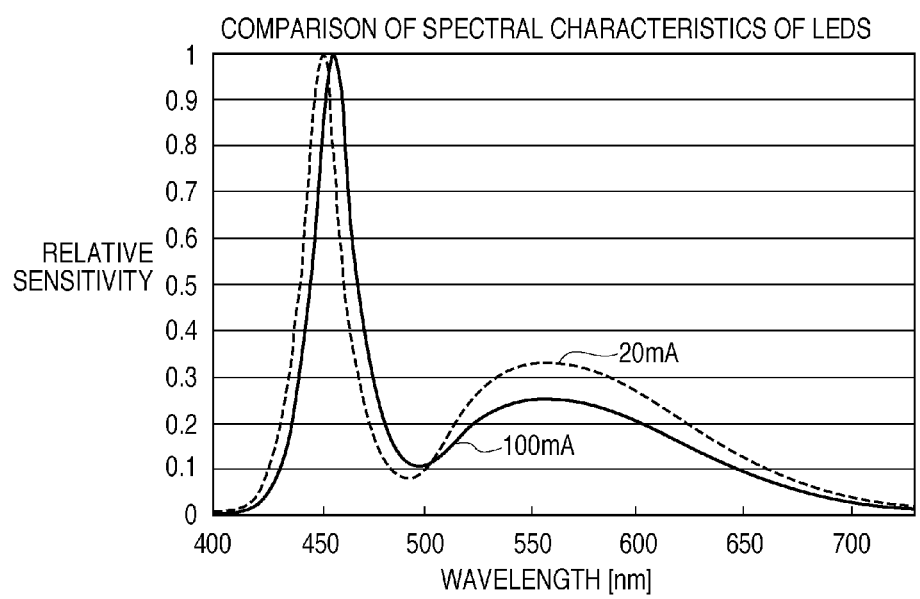
FIGS. 16A and 16B depict views illustrating graphs of an example of comparison of the spectral characteristics of the LED in FIG. 15 and an improvement example, respectively.

FIG. 16A depicts a view illustrating a graph showing comparison between the spectral characteristic of an LED having the chromaticity-current dependence in FIG. 15 for a driving current of 20 mA and that for a driving current of 100 mA. The abscissa represents the wavelength, and the ordinate represents the relative sensitivity. The dotted line in FIG. 16A indicates the spectral characteristic of the white LED driven at 20 mA, and the solid line indicates the spectral characteristic of the white LED driven at 100 mA.

As can be seen from FIG. 16A, near the peak wavelength 450 nm, the wavelengths corresponding to the peak values slightly shift in 20-mA driving and in 100-mA driving. This wavelength shift is assumed to be caused by heat generated as the driving current amount increases. Near the peak wavelength 550 nm of the green wavelength band, the peak sensitivity is lower in 100-mA driving than in 20-mA driving. This is because the peak sensitivity of the blue LED at the peak wavelength 450 nm becomes relatively higher than that of the yellow phosphor at the peak wavelength 550 nm as the driving current amount of the LED increases, as described above. The reading characteristic of the optical system is adjusted to a desired characteristic by using the change in the spectral characteristic depending on the amount of current to be supplied to the LED.

[PWM Control of LED Light Amount]

When the amount of current to be supplied to the LED is changed by the above-described method, the emitted light amount also changes. To prevent this, in this embodiment, the amount of power supplied to the LED is controlled by PWM, thereby controlling the light amount of the LED to a target light amount.

Figure 17:
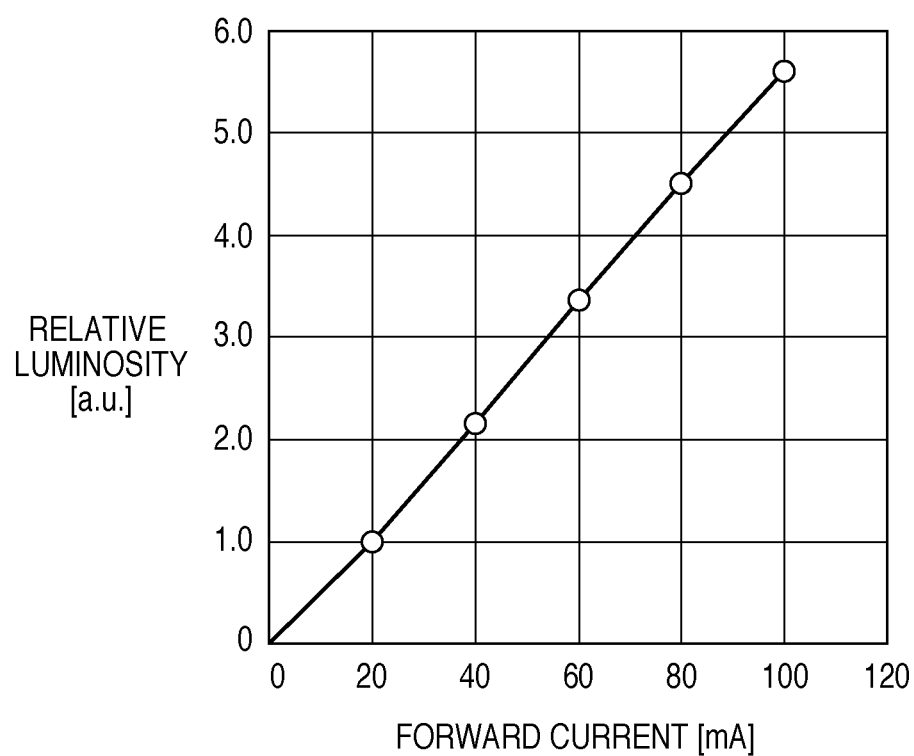
FIG. 17 depicts a view illustrating a graph of the dependence of the luminosity of a white LED on a supplied current amount.

FIG. 17 depicts a view illustrating a graph showing the dependence of the luminosity of the white LED on the supplied current amount. The abscissa represents the forward current, and the ordinate represents the relative luminosity. In FIG. 17, when the luminosity upon supplying 20 mA is defined as "1", the current amount upon supplying 100 mA is "5.5". The luminosity is higher by 5.5 times. If the light amount at 20 mA is assumed to be a necessary and sufficient light amount, a current 5.5 times as large as the required light amount is supplied upon supplying 100 mA. The amount of power supplied to the LED is controlled by PWM.

Figure 18A:
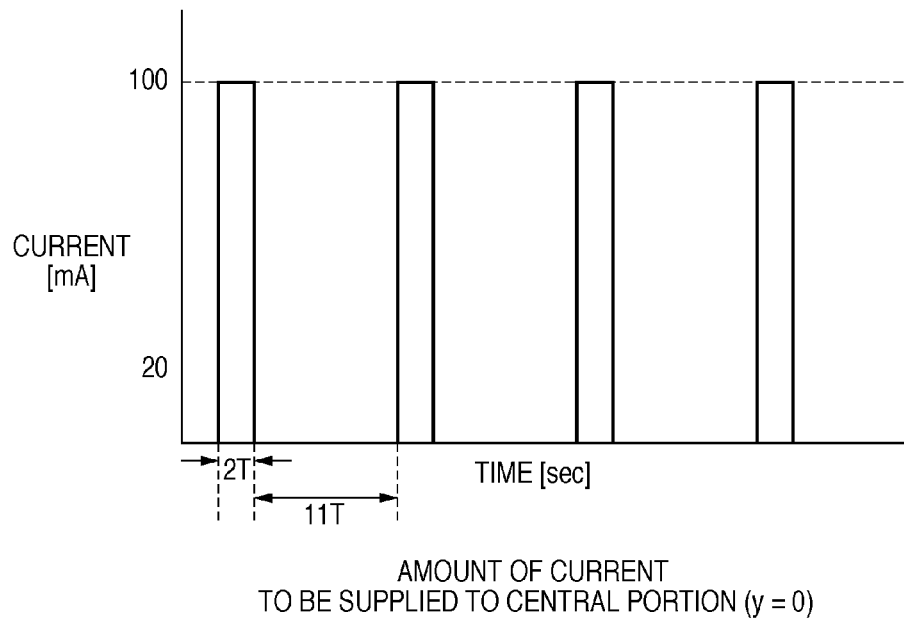
FIGS. 18A and 18B are timing charts describing examples of PWM control of the amount of current to be supplied to a white LED.
Figure 18B:
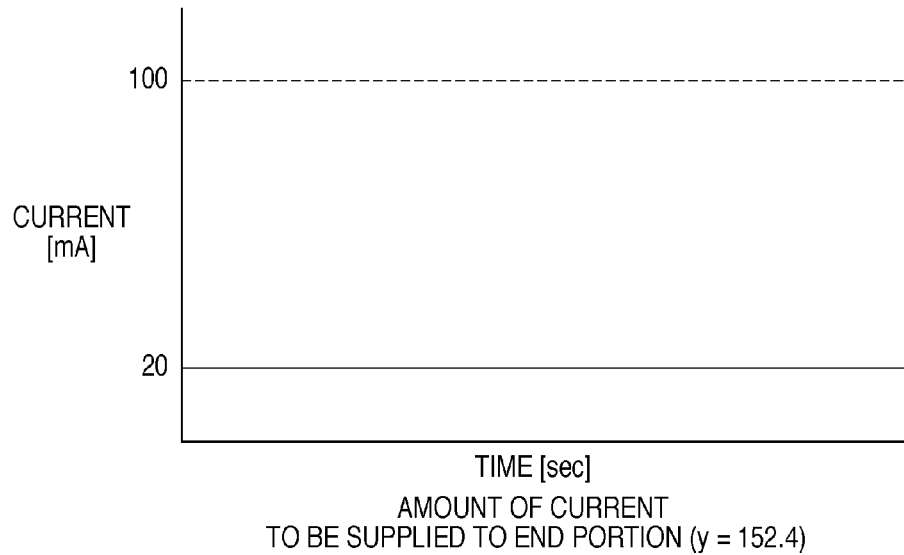

FIGS. 18A and 18B are timing charts showing examples of PWM control of the amount of power supplied to the white LED. The abscissa represents time, and the ordinate represents the supplied current amount. As is apparent from FIG. 17, since the supplied current amount at the central portion is five times (100 mA) (FIG. 18A) as large as that at the end portion (20 mA) (FIG. 18B), and the luminosity rises to 5.5 times, the necessary effective current amount is 1/5.5 times. That is, if current supply at the end portion is done at a duty ratio of 100%, as shown in FIG. 18B, current supply at the central portion need only be 2/11=about 18.2% per unit time, as shown in FIG. 18A.

The amount of current to be supplied to the LED is controlled by PWM so as to prevent an unnecessary increase in the light amount and adjust the reading characteristic of the optical system to a desired characteristic.

Figure 19:
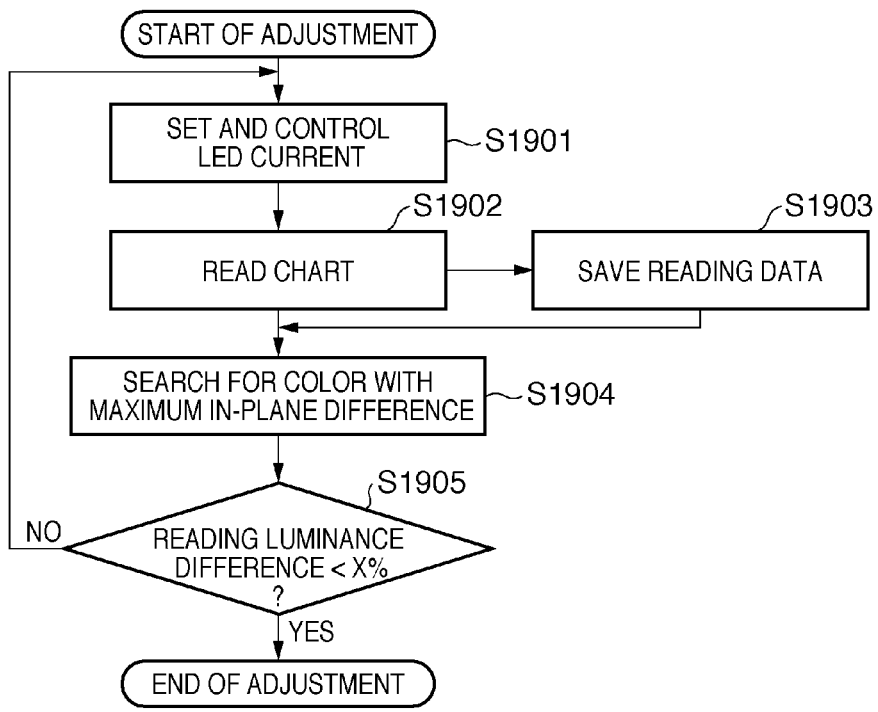
FIG. 19 is a flowchart describing processing of adjusting a reading sensitivity characteristic according to the embodiment.

FIG. 19 is a flowchart describing adjusting the emission chromaticity of the LED at the end portion and central portion in the main scanning direction by the supplied current amount and PWM, and adjusting the reading characteristic to the entire optical system so as to make the characteristic at the end portion in the main scanning direction almost match that at the central portion.

Figure 20:
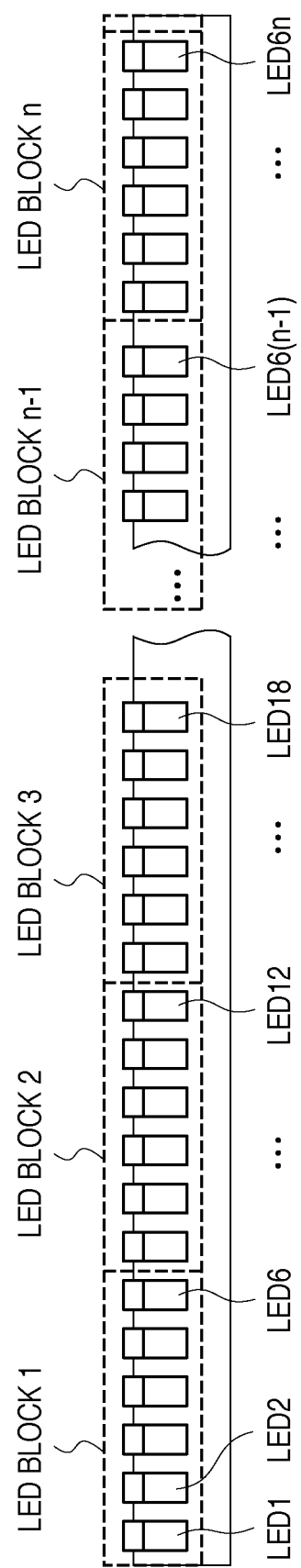
FIG. 20 depicts a view showing an example in which two or more light sources form a block.

In step S1901, the amount of current to be supplied to each of a plurality of white LEDs arranged in the main scanning direction as shown in FIG. 20, and for PWM control, the duty ratio for each LED are set. As initial adjustment, the same current amount and the same duty ratio may be set for all LEDs. Alternatively, setting may be done in accordance with a preset profile. Details of the setting will be described later. A chart to be read in step S1902 has a color bar with a uniform density in the main scanning direction, as shown in FIG. 9. Luminance data at two or more points from the end portion to the central portion in the main scanning direction are acquired. Note that the chart read here need not always have three, CMY colors, as shown in FIG. 9. Color bars of RGB or any other colors may be used.

The process advances to step 1903 to save the luminance data of the chart read in step S1902. The process advances to step S1904 to search the luminance data saved in step S1903 for one of colors of the chart whose luminance difference between the end portion and the central portion in the main scanning direction is maximum. In step S1905, it is determined whether the luminance difference is less than or equal to a threshold X % (for example, 3%).

More specifically, the determination is done by $$X > \{(\text{maximum value of color of interest in main scanning direction}) - (\text{minimum value of color of interest in main scanning direction})\} / [\{(\text{maximum value of color of interest in main scanning direction}) + (\text{minimum value of color of interest in main scanning direction})\}/2] \quad (1.9)$$

The process then advances to step S1905 to determine whether the maximum luminance difference between the end portion and the central portion in the main scanning direction for one of all colors of the chart is less than or equal to the threshold X %. If the luminance difference exceeds the threshold X %, the process returns to step S1901 to reset the driving current amount and duty ratio for each LED. Chart reading in step S1902 is performed again. Then, searching for the color having the maximum in-plane difference in step S1904 is repeated. The operation of step S1904 will be described later in detail. Upon determining in step S1905 that the luminance difference is less than or equal to the threshold X %, LED adjustment ends.

Figure 21:
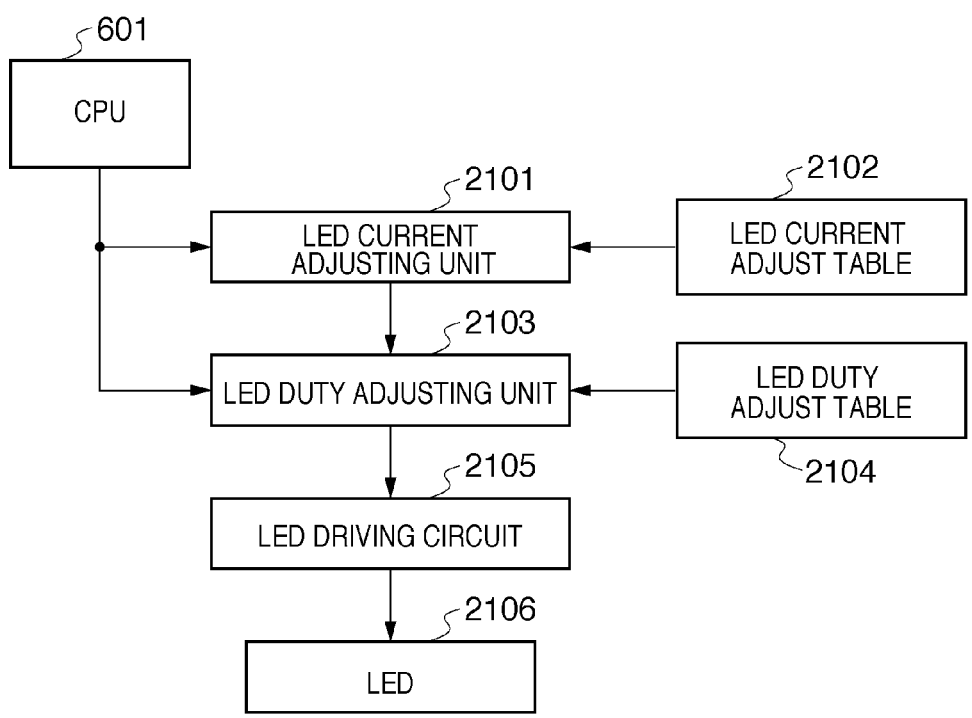
FIG. 21 is a block diagram of an LED driving circuit and peripheral circuits.

FIG. 21 is a block diagram of the LED driving circuit and peripheral circuits according to the embodiment.

The CPU 601 sets adjustment parameters for an LED current adjusting (current setting) unit 2101 and an LED duty adjusting (duty setting) unit 2103. The adjustment parameters are values determined in accordance with the flowchart shown in FIG. 19. An LED current adjust table 2102 stores settings to implement the adjustment parameters requested of the LED current adjusting unit 2101 by the CPU 601. An LED duty adjust table 2104 has a table shown in FIG. 22B. The duty ratio corresponding to the parameter requested of the LED duty adjusting unit 2103 by the CPU 601 and the current amount to the LED determined by the LED current adjusting unit 2101 can be determined.

The LED current adjust table 2102 stores the reading luminance of the chart corresponding to each driving current as a table shown in FIG. 22A. Referring to FIG. 22A, for the color having the maximum luminance difference, a combination of current set values which minimizes the reading luminance difference between the end portion and the central portion in the main scanning direction is selected.

For example, if the LED is driven at 20 mA, the reading luminances are 168.4 at the central portion and 151.8 at the end portion. The reading luminance difference is 168.4−151.8=16.6. The reading luminance at the end portion, which is closest to the reading luminance "168.4" at the central portion in 20-mA driving, is "169.9" at the end portion in 100-mA driving. The reading luminance difference is 169.9−168.4=1.5. This is about 10% of the reading luminance difference "16.6" in 20-mA driving.

For the thus determined amounts of current supplied to the LEDs at the end portion and central portion in the main scanning direction, it is determined in step S1905 of FIG. 19 whether the maximum luminance difference between the end portion and the central portion in the main scanning direction for one of all colors of the chart is less than or equal to the threshold X %. Assume that the determination threshold X=3%.

(when 20 mA at both end portion and central portion)

(168.4−151.8)/{(168.4+151.8)/2}=10.3[%]

(when 100 mA at end portion and 20 mA at central portion)

(169.9−168.4)/{(169.9+168.4)/2}=0.8[%]

As described above, when the driving current is set to 100 mA at the end portion and 20 mA at the central portion, the luminance difference is less than the determination threshold 3%. For yellow, this combination is expected to almost eliminate unevenness in the main-scanning reading luminance. The chart is actually read again based on this combination (the driving current at the end portion is 100 mA, and that at the central portion is 20 mA), and it is confirmed whether other colors also satisfy the condition concerning "determination threshold X=3%". Upon confirming that all colors of the chart satisfy the condition concerning the determination threshold, the combination (the combination of the amounts of current to be supplied to the LEDs at the end portion and central portion) is set in the LED current adjusting unit 2101 as formal current amounts. If any combination cannot satisfy the condition concerning the determination threshold for all colors, a combination that minimizes the maximum difference between the end portion and the central portion in the main scanning direction may be adopted. Alternatively, a combination that satisfies the condition concerning the determination threshold for specific colors (for example, basic colors such as RGB or CMY) may be adopted.

The LED duty adjust table 2104 stores duty ratios corresponding to LED supply current amounts as shown in FIG. 22B. As shown in FIG. 17, the light emission amount of the LED almost linearly changes with respect to the driving current value. Referring to the table in FIG. 22B, a duty ratio (the ratio of ON period to OFF period) to be set in correspondence with the amount of current to be supplied to each LED, which is set by the LED current adjusting unit 2101, is determined.

The thus determined driving current values and duty ratio are set in an LED driving circuit 2105, and an LED 2106 is on-controlled. Note that although one LED is exemplified in FIG. 21, the number of LEDs 2106 to be driven by the LED driving circuit 2105 need not always be one. However, to individually set the amounts of current to be supplied to the LEDs, circuits as many as the LEDs are necessary for adjusting the current amounts. However, if the number of LEDs increases, the number of circuits for adjusting the current amounts also increases, and the area occupied by the circuits on the substrate increases.

In this embodiment, six LEDs are regarded as one block, as shown in FIG. 20, and a method of adjusting the current amount to be supplied for each block is employed. Employing this method enables to largely reduce the number of circuits for supplying the current to ⅙ the previous number. Note that the number of LEDs to be controlled as a block is not limited to six. The number is freely set without large influence on the continuity of luminance in the main scanning direction. To control a plurality of LEDs as one block, as shown in FIG. 20, the LED current adjusting unit 2101, LED duty adjusting unit 2103, and LED driving circuit 2105 are provided for each block.

The effect of adjustment of the amount of current to be supplied to the LED in step S1901 will be described next.

Figure 16B:
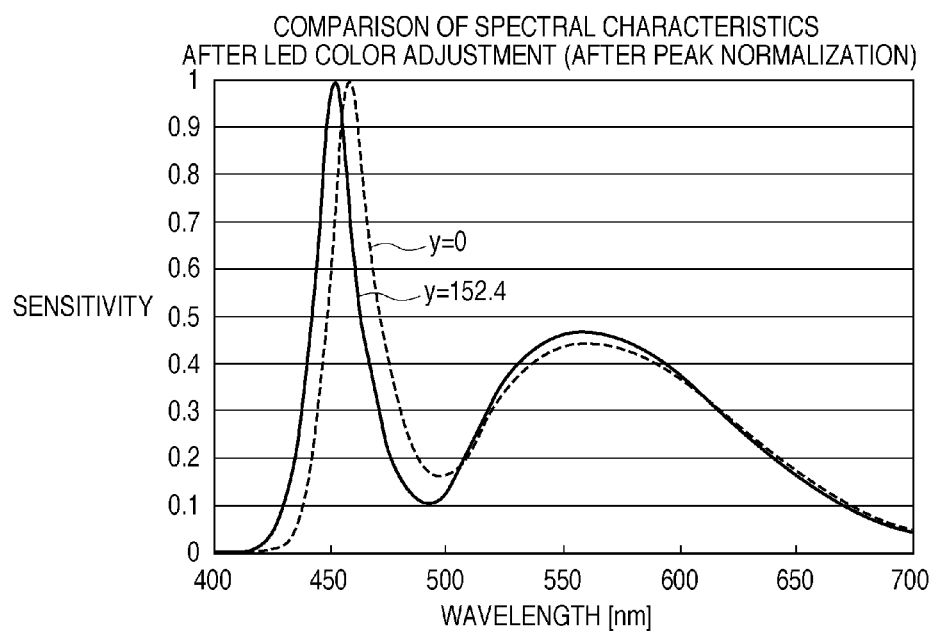

FIG. 16B depicts a view illustrating a graph showing an example in which the spectral characteristic difference of the entire optical system between the end portion and the central portion in the main scanning direction is improved using the characteristic shown in FIG. 16A. The abscissa represents the wavelength, and the ordinate represents the sensitivity. The dotted line (y=0) in FIG. 16B indicates the spectral characteristic of the entire optical system at the central portion in the main scanning direction. The solid line (y=152.4) indicates the spectral characteristic of the entire optical system at the end portion in the main scanning direction.

As is apparent from FIG. 16B, the spectral characteristics almost match, although there are observed a slight wavelength shift between the end portion and the central portion in the main scanning direction near the peak wavelength 450 nm of the blue LED and a slight sensitivity difference between the end portion and the central portion in the main scanning direction near the peak wavelength 550 nm of the yellow phosphor. The influence of the wavelength shift between the end portion and the central portion in the main scanning direction near the peak wavelength 450 nm of the blue LED on the reading luminance in FIG. 16B will be described.

In the spectral characteristic of the reading optical system shown in FIG. 16B, the wavelength shift near the peak wavelength 450 nm of the blue LED is estimated to have the largest influence. The color whose reading luminance is affected by the wavelength shift is the color whose spectral reflectance largely changes in the wavelength band where the wavelength shift has occurred. As described above, the reading luminance is represented by the integration of the spectral characteristic of the reading optical system and the spectral reflectance of the reading target color. Hence, the peak wavelength shift near the peak wavelength where the spectral characteristic of the entire reading optical system concentrates means that the integral value of the spectral characteristic of the reading optical system and the spectral reflectance of the reading target color changes.

Figure 23:
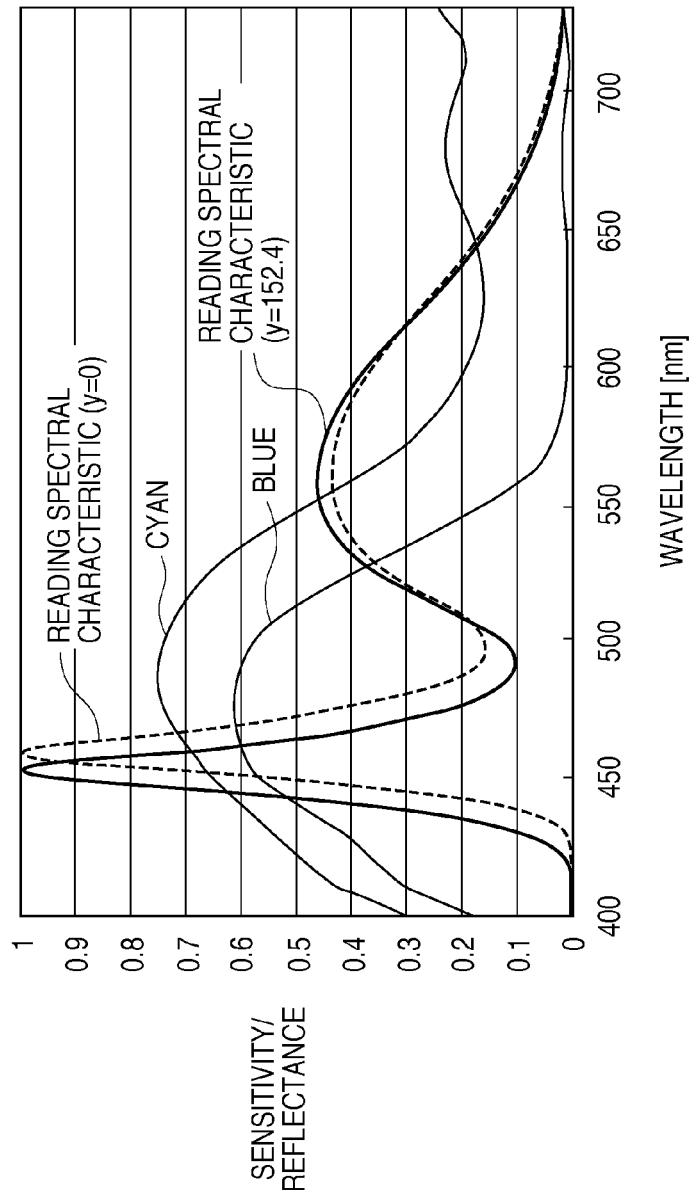
FIG. 23 depicts a view illustrating a graph of comparison between the spectral characteristic of an entire improved optical system at the end portion in the main scanning direction and that at the central portion and comparison between the spectral reflectances of color bars.

FIG. 23 depicts a view illustrating a graph showing comparison between the spectral characteristic of the entire improved optical system shown in FIG. 16B at the end portion in the main scanning direction and that at the central portion and comparison between the spectral reflectances of cyan and blue. The abscissa represents the wavelength, and the ordinate represents the sensitivity or reflectance. FIG. 22C shows the main-scanning reading luminance differences of cyan and blue. As can be seen from FIG. 22C as well, the reading luminance differences affected by the peak wavelength shift of the blue LED are not so large. This is because the spectral characteristic of the blue LED observed near the wavelength 450 nm is very steep, and the spectral characteristic of the blue LED observed near the wavelength 450 nm is very steep, whereas the spectral characteristic of the yellow phosphor observed within the range of 500 nm to 700 nm is very moderate. This indicates that the moderate spectral characteristic of the yellow phosphor is affected in a wider range than the spectral characteristic at the peak of 450 nm.

The spectral characteristic before color adjustment of the optical system shown in FIG. 7B does not largely change between the end portion and the central portion in the main scanning direction near the peak wavelength 450 nm of the blue LED. However, the sensitivity of the yellow phosphor is lower by about 13% at the end portion in the main scanning direction than at the central portion. Hence, the difference in the emission chromaticity of the white LED shown in FIG. 16A, which is generated by the difference in the amount of current to be supplied to the LED, is used.

More specifically, an LED to be driven at 100 mA, as shown in FIG. 16A, is employed at the central portion where the peak sensitivity near the wavelength 550 nm is higher than that at the end portion in the main scanning direction. This makes the influence of the peak sensitivity near the peak wavelength 550 nm smaller than in 20-mA driving. That is, the spectral characteristic difference of the reading optical system between the central portion and the end portion in the main scanning direction is made smaller. This makes it possible to reduce the reading luminance difference upon reading the same color at the end portion and the central portion in the main scanning direction, and thus reduce the unevenness in the main-scanning reading luminance.

Figures 24A, 24B:
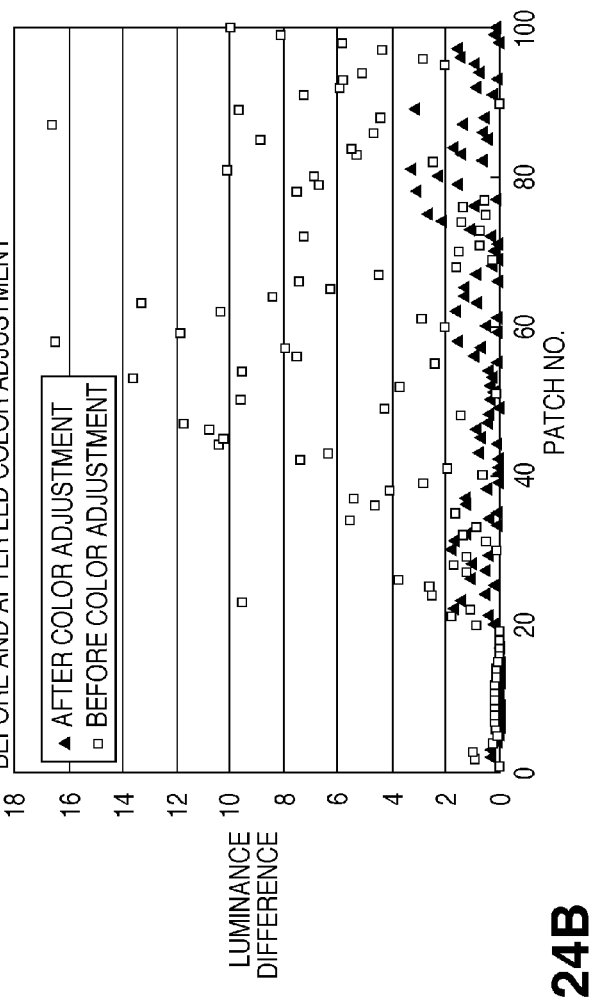
FIGS. 24A and 24B depict views showing an example of reading luminance difference between the central portion and the end portion in the main scanning direction when color patches are read using an optical system having the spectral characteristic shown in FIG. 16B.
Figure 25:
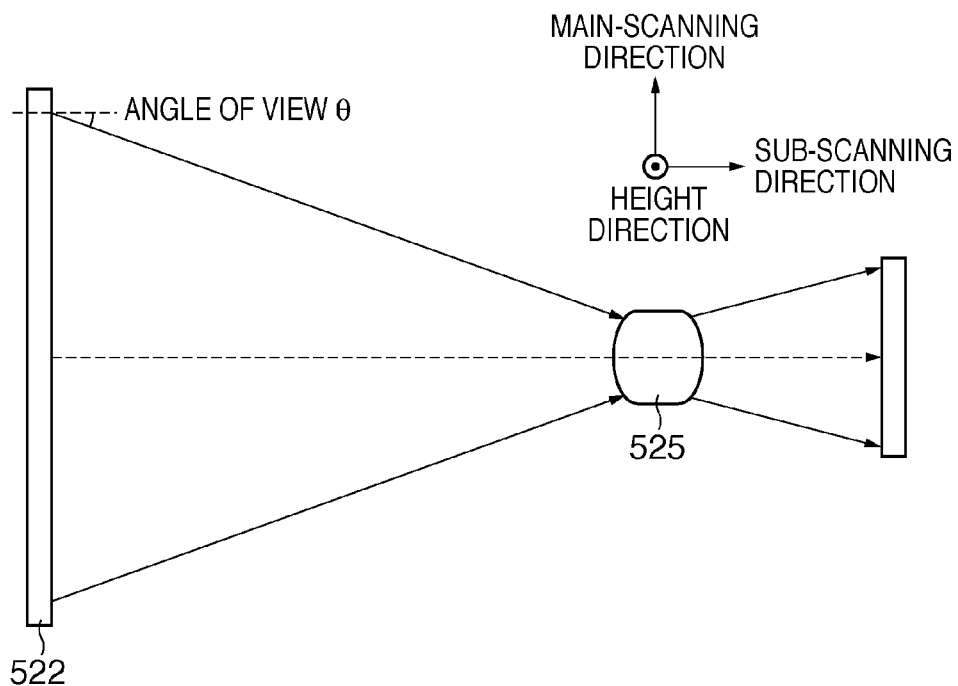
FIG. 25 depicts a plan view for explaining a viewing angle in a general image reading apparatus.
Figure 26:
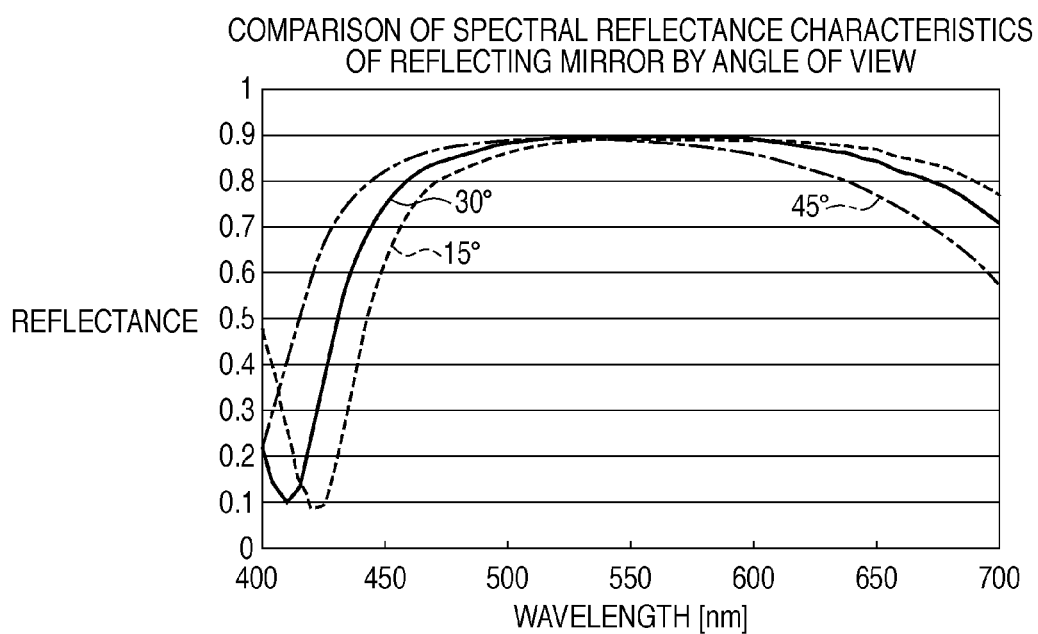
FIG. 26 depicts a view illustrating a graph of the spectral characteristic of a reflecting mirror corresponding to the difference in the viewing angle.

FIG. 24A depicts a view illustrating a graph showing the reading luminance difference between the central portion and the end portion in the main scanning direction when color bars of 100 colors are read using an optical system having the spectral characteristic shown in FIG. 16B. The 100 colors includes an achromatic portion (Nos. 1 to 20) that expresses densities stepwise by an achromatic color (gray) and a chromatic portion (color bars Nos. 21 to 100) that includes the entire color gamut including RGB and CMY. The reading luminance of each color is expressed as a relative value with respect to a value normalized by setting the reading luminance of the white reference member at "255", as described above.

Referring to FIG. 24A, the abscissa represents the color number, and the ordinate represents the reading luminance difference. In FIG. 24A, squares indicate the reading luminance difference between the central portion and the end portion in the main scanning direction before color adjustment by the LEDs (an optical system having the spectral characteristic in FIG. 7B), and black triangles indicates the reading luminance difference after color adjustment by the LEDs (an optical system having the spectral characteristic in FIG. 16B). As is apparent from FIG. 24A as well, the reading luminance difference between the end portion and the central portion in the main scanning direction is about 16 in level at maximum before LED color adjustment, but decreases to about 3 in level at maximum after LED color adjustment.

FIG. 24B depicts a view showing a table of comparison of three of the 100 color bars shown in FIG. 24A, which are worst in the reading luminance difference between the central portion and the end portion in the main scanning direction.

Before LED color adjustment, the reading luminance differences are large in color bars mainly having yellow tints. After LED color adjustment, the reading luminance differences decrease to almost 0 in level (2 or less in level). The reason is as follows. In FIG. 7B, the spectral characteristic largely changes between the end portion and the central portion in the main scanning direction near the peak wavelength 550 nm of the yellow phosphor. In FIG. 16B, to the contrary, the spectral characteristic difference between the end portion and the central portion in the main scanning direction near the peak wavelength 550 nm of the yellow phosphor is almost zero.

[Current Amount to Be Supplied to LED Except for End Portion and Central Portion]

The above discussion has been made mainly concerning the end portion and the central portion in the main scanning direction. For positions other than the central portion and the end portion, for example, a position having a slight higher image height than y=0 at the central portion (the image height is lowest), the LED chromaticity adjustment amount is linearly obtained based on the amounts of current to be supplied to the LEDs at the central portion and the end portion. More specifically, let Ic be the current amount to be supplied to the central portion, and It be the current amount to the end portion. Then, a supplied current amount Ix at an arbitrary position x (x=1 to 152.4) is given by $$Ix=(1-x/152.4)Ic+(x/152.4)It \quad (1.10)$$

For example, the supplied current amount at a position corresponding to y=50 is obtained as 67.75 mA by substituting x=50, Ic=100, and It=20 into equation (1.10). The current amount necessary at each LED position is obtained in this way.

[Duty Ratio of Current to Be Supplied to LED Except for End Portion and Central Portion]

In the above examples, the duty ratios of currents to be supplied to the LEDs have also been described in comparison between the end portion and the central portion in the main scanning direction, like the amounts of current to be supplied to the LEDs. For positions other than the central portion and the end portion in the main scanning direction, the duty ratio of a current to be supplied to each LED can be determined in accordance with the table shown in FIG. 22B based on the amounts of current to be supplied to the LEDs at arbitrary positions, which are determined by equation (1.10).

In addition, even when controlling a plurality of LEDs as a block, as shown in FIG. 20, the duty ratio of a current to be supplied to the LEDs can be determined, like the above-described amount of current to be supplied to the LEDs. It is necessary to only determine the duty ratio of a current to be supplied to each block.

Note that since the current and voltage do not change in PWM control of LEDs, as described above, the chromaticity rarely changes. It is therefore possible to obtain a desired chromaticity and desired light amount at an arbitrary position in the main scanning direction by the above-described method.

As describe above, according to this embodiment, when a spectral characteristic difference in reading exists from the end portion to the central portion in the main scanning direction of the image reading apparatus, currents to be supplied to the LEDs are continuously changed from the end portion to the central portion in the main scanning direction. This allows to adjust the spectral characteristic of the reading optical system to be almost uniform in the main scanning direction. An LED light amount that is increased by a thus adjusted current amount more than necessary from the original light amount is controlled by PWM. This combination suppresses any increase in the size and cost of the apparatus and the number of colors of reference boards or complication of circuit arrangement. It is also possible to reduce unevenness in the main-scanning reading luminance of a chromatic color.

The reflecting surface of the imaging mirror that forms part of the imaging unit is preferably an offaxial reflecting surface. The offaxial reflecting surface has a curvature and a reflecting direction different from the reference optical axis ray incident direction. Hence, the offaxial reflecting surface is advantageous for size reduction of the image reading apparatus.

This embodiment is particularly effective in an image reading apparatus which performs shading correction using only the white reference member. Generally, shading correction using only the white reference member is insufficient for a chromatic color. Hence, sufficient shading correction can be done even for a chromatic color. It is therefore possible to reduce the number of reference boards of colors other than color-managed white.

To downsize the image reading apparatus, a moving unit which integrates the light source, imaging unit, and photoelectric conversion unit is preferably employed. However, employing such a moving unit increases the difference in the viewing angle between the end portion and the central portion in the main scanning direction, and also readily generates the difference in the spectral characteristic. It is therefore possible to suppress luminance unevenness even when employing such a moving unit. Note that in an image forming apparatus such as a copying machine, luminance unevenness in the image reading apparatus is directly linked with color unevenness. Hence, if luminance unevenness can be reduced, color unevenness in the image forming apparatus can be reduced.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-232863, filed Oct. 6, 2009, which is hereby incorporated by reference herein in its entirety.

What is claimed is:

1. An image reading apparatus comprising:
   a light source unit that irradiates a document over an elongated reading area, the light source unit including a plurality of light sources each having an LED;
   an imaging unit that converges light reflected from the document irradiated by the light source unit;
   a plurality of color separation units that have different passing wavelength bands from each other;
   a plurality of photoelectric conversion units each of which converts the reflected light passing through one of the color separation units having a passing wavelength band different from the other passing wavelength bands into an electrical signal;
   a current amount setting unit that sets an amount of current to be supplied to each light source of the light source unit;
   a duty setting unit that sets a duty ratio for each light source of the light source unit based on the amount of current set by the current amount setting unit, such that a luminance difference arising due to the amount of current to be supplied to each light source is reduced; and
   a driving unit that drives the each light source by pulse-width modulation based on the amount of current set by the current amount setting unit and the duty ratio set by the duty setting unit for the corresponding light source,
   wherein the current amount setting unit sets the amount of current of a light source for irradiating a center of the elongated reading area and the amount of current of light sources for irradiating ends of the elongated reading area, such that a difference between a value of the electrical signal of the center of the elongated reading area and values of the electrical signals of the ends of the elongated reading area is reduced.

2. The apparatus according to claim 1, wherein each of the light sources has an LED for emitting blue light and a yellow phosphor.

3. The apparatus according to claim 1, wherein the duty setting unit comprises a storage unit that stores duty ratios corresponding to the current amounts.

4. The apparatus according to claim 1, wherein the amounts of light of the light sources for irradiating areas other than the center and the ends of the elongated reading area are calculated based on the amounts of current of the light sources for irradiating the center and the ends of the elongated reading area.

5. The apparatus according to claim 4, wherein the amounts of current set for the light sources are continuously changed from the light source for irradiating the center of the elongated reading area to the light sources for irradiating the ends of the elongated reading area.

* * * * *